US012593340B2

(12) United States Patent
MolavianJazi et al.

(10) Patent No.: US 12,593,340 B2
(45) Date of Patent: Mar. 31, 2026

(54) MULTI-BEAM OPERATION FOR MULTI-CELL SCHEDULING

(71) Applicant: Samsung Electronics Co., Ltd., Suwon-si (KR)

(72) Inventors: Ebrahim MolavianJazi, San Jose, CA (US); Emad Nader Farag, Flanders, NJ (US); Dalin Zhu, Allen, TX (US); Aristides Papasakellariou, Houston, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 228 days.

(21) Appl. No.: 18/447,237

(22) Filed: Aug. 9, 2023

(65) Prior Publication Data

US 2024/0064772 A1     Feb. 22, 2024

Related U.S. Application Data

(60) Provisional application No. 63/448,575, filed on Feb. 27, 2023, provisional application No. 63/405,289, filed on Sep. 9, 2022, provisional application No. 63/399,606, filed on Aug. 19, 2022.

(51) Int. Cl.
| | |
|---|---|
| *H04W 72/232* | (2023.01) |
| *H04L 5/00* | (2006.01) |
| *H04W 72/1273* | (2023.01) |

(52) U.S. Cl.
CPC ......... *H04W 72/232* (2023.01); *H04L 5/0092* (2013.01); *H04W 72/1273* (2013.01)

(58) Field of Classification Search
None
See application file for complete search history.

(56) References Cited

U.S. PATENT DOCUMENTS

| | | | |
|---|---|---|---|
| 2019/0313429 A1* | 10/2019 | Cheng | H04W 76/27 |
| 2020/0229161 A1* | 7/2020 | Raghavan | H04W 24/10 |
| 2021/0068129 A1* | 3/2021 | Ryu | H04L 5/0055 |

(Continued)

OTHER PUBLICATIONS

"3rd Generation Partnership Project; Technical Specification Group Radio Access Network; NR; Physical channels and modulation (Release 17)", 3GPP TS 38.211 V17.2.0, Jun. 2022, 136 pages.

(Continued)

*Primary Examiner* — Clemence S Han

(57) ABSTRACT

Methods and apparatuses for multi-beam operation for multi-cell scheduling. A method includes receiving first information for a set of cells, second information for a set of transmission configuration indication (TCI) states associated with each cell in the set of cells, respectively, and a first physical downlink control channel (PDCCH) that provides a first DCI format. The first DCI format schedules receptions of first physical downlink shared channels (PDSCHs) on respective first cells from the set of cells. The first DCI format includes a first TCI field indicating a combination of TCI states that includes a number of TCI states that is equal to a number of cells in the set of cells. The method further includes determining first TCI states from the combination of TCI states and receiving the first PDSCHs, or second PDSCHs after the first PDSCHs, on the first cells based on the first TCI states, respectively.

20 Claims, 8 Drawing Sheets

(56)        References Cited

U.S. PATENT DOCUMENTS

| | | | | |
|---|---|---|---|---|
| 2021/0258964 | A1* | 8/2021 | Khoshnevisan | ..... H04B 7/0478 |
| 2022/0061117 | A1* | 2/2022 | Liou | ..................... H04L 5/0053 |
| 2022/0150945 | A1* | 5/2022 | Zhang | .................. H04L 5/0053 |
| 2022/0210800 | A1* | 6/2022 | Babaei | .................. H04L 5/0092 |
| 2022/0217695 | A1 | 7/2022 | Liou et al. | |
| 2023/0114010 | A1* | 4/2023 | Zhu | ...................... H04W 24/08 |
| | | | | 370/329 |
| 2023/0144103 | A1* | 5/2023 | Gao | ..................... H04W 72/20 |
| | | | | 370/329 |
| 2023/0180199 | A1* | 6/2023 | Jung | .................... H04L 1/0038 |
| | | | | 370/329 |
| 2023/0354215 | A1* | 11/2023 | Huang | ............... H04W 72/232 |
| 2023/0389019 | A1* | 11/2023 | Huang | ................ H04L 5/0053 |
| 2023/0396307 | A1* | 12/2023 | Bhamri | ............. H04B 7/06952 |
| 2024/0137087 | A1* | 4/2024 | Bhamri | ................. H04B 7/086 |
| 2024/0154762 | A1* | 5/2024 | Li | ......................... H04L 5/0035 |
| 2024/0372689 | A1* | 11/2024 | Gao | ...................... H04L 5/0094 |
| 2025/0070945 | A1* | 2/2025 | Liu | ....................... H04L 1/1861 |
| 2025/0089068 | A1* | 3/2025 | Matsumura | ......... H04W 72/232 |
| 2025/0159693 | A1* | 5/2025 | Matsumura | .......... H04L 5/0023 |

OTHER PUBLICATIONS

"3rd Generation Partnership Project; Technical Specification Group Radio Access Network; NR; Multiplexing and channel coding (Release 17)", 3GPP TS 38.212 V17.2.0, Jun. 2022, 201 pages.

"3rd Generation Partnership Project; Technical Specification Group Radio Access Network; NR; Physical layer procedures for control (Release 17)", 3GPP TS 38.213 V17.2.0, Jun. 2022, 256 pages.

"3rd Generation Partnership Project; Technical Specification Group Radio Access Network; NR; Physical layer procedures for data (Release 17)," 3GPP TS 38.214 V17.2.0 , Jun. 2022, 228 pages.

"5G; NR; Medium Access Control (MAC) protocol specification (3GPP TS 38.321 version 17.1.0 Release 17)", ETSI TS 138 321 V17.1.0 , Aug. 2022, 244 pages.

"5G; NR; Radio Resource Control (RRC); Protocol specification (3GPP TS 38.331 version 17.1.0 Release 17)", ETSI TS 138 331 V17.1.0, Aug. 2022, 1257 pages.

"5G; NR; NR and NG-RAN Overall description; Stage-2 (3GPP TS 38.300 version 17.1.0 Release 17)", ETSI TS 138 300 V17.1.0, Aug. 2022, 211 pages.

International Search Report and Written Opinion issued Nov. 24, 2023 regarding International Application No. PCT/KR2023/012261, 6 pages.

Apple Inc., "Unified TCI framework extension for multi-TRP", 3GPP TSG RAN WG1 #110, R1-2207320, Aug. 2022, 10 pages.

LG Electronics, "Unified TCI framework extension for multi-TRP/panel", 3GPP TSG RAN WG1 #110, R1-2206866, Aug. 2022, 9 pages.

Fraunhofer Iis et al., "Multi-TRP enhancements for the unified TCI framework", 3GPP TSG RAN WG1 Meeting #110, R1-2206975, Aug. 2022, 8 pages.

Panasonic, "Unified TCI framework extension for multi-TRP", 3GPP TSG-RAN WG1 Meeting #110, R1-2207265, Aug. 2022, 10 pages.

* cited by examiner

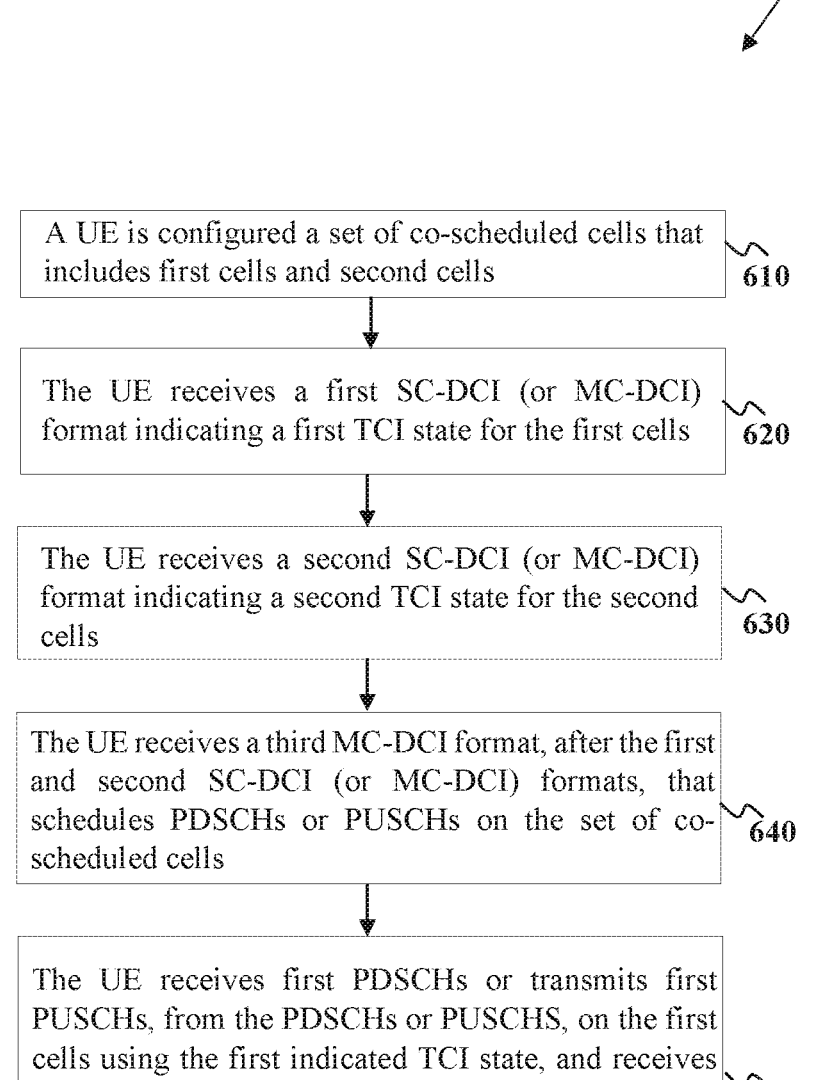

A UE is configured a set of co-scheduled cells that includes first cells and second cells     610

The UE receives a first SC-DCI (or MC-DCI) format indicating a first TCI state for the first cells     620

The UE receives a second SC-DCI (or MC-DCI) format indicating a second TCI state for the second cells     630

The UE receives a third MC-DCI format, after the first and second SC-DCI (or MC-DCI) formats, that schedules PDSCHs or PUSCHs on the set of co-scheduled cells     640

The UE receives first PDSCHs or transmits first PUSCHs, from the PDSCHs or PUSCHS, on the first cells using the first indicated TCI state, and receives second PDSCHs or transmits second PUSCHs, from the PDSCHs or PUSCHS, on the second cells using the second indicated TCI state     650

FIG. 6

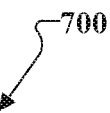

700

A UE is configured first and second lists of cells for simultaneous TCI state update

710

The UE is configured a set of co-scheduled cells that includes first cells from the first list of cells and second cells from the second list of cells

720

The UE receives an MC-DCI format that schedules PDSCHs or PUSCHs on the set of co-scheduled cells, and includes first and second values for a TCI state field

730

The UE applies a first TCI states, corresponding to the first value, to the first cells (or to the first list or cells) and applies a second TCI state, corresponding to the second value, to the second cells (or to the second list of cells)

MULTI-BEAM OPERATION FOR MULTI-CELL SCHEDULING

CROSS-REFERENCE TO RELATED APPLICATION AND CLAIM OF PRIORITY

This application claims priority under 35 U.S.C. § 119(e) to U.S. Provisional Patent Application No. 63/399,606 filed on Aug. 19, 2022, U.S. Provisional Patent Application No. 63/405,289 filed on Sep. 9, 2022, and U.S. Provisional Patent Application No. 63/448,575 filed on Feb. 27, 2023. The above-identified provisional patent applications are hereby incorporated by reference in their entirety.

TECHNICAL FIELD

The present disclosure relates generally to wireless communication systems and, more specifically, to multi-beam operation for multi-cell scheduling.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to multi-beam operation for multi-cell scheduling.

In one embodiment, a method is provided. The method includes receiving first information for a set of cells, second information for a set of transmission configuration indication (TCI) states associated with each cell in the set of cells, respectively, and a first physical downlink control channel (PDCCH) that provides a first DCI format. The first DCI format schedules receptions of first physical downlink shared channels (PDSCHs) on respective first cells from the set of cells. The first DCI format includes a first TCI field indicating a combination of TCI states. The combination of TCI states includes a number of TCI states that is equal to a number of cells in the set of cells. TCI states in the combination of TCI states have a one-to-one mapping to the cells in the set of cells. The method further includes determining first TCI states, from the combination of TCI states, having a one-to-one mapping with the first cells and receiving the first PDSCHs, or second PDSCHs after the first PDSCHs, on the first cells based on the first TCI states, respectively.

In another embodiment, a user equipment (UE) is provided. The UE includes a transceiver configured to receive first information for a set of cells, second information for a set of TCI states associated with each cell in the set of cells, respectively, and a first PDCCH that provides a first DCI format. The first DCI format schedules receptions of first PDSCHs on respective first cells from the set of cells. The first DCI format includes a first TCI field indicating a combination of TCI states. The combination of TCI states includes a number of TCI states that is equal to a number of cells in the set of cells. The TCI states in the combination of TCI states have a one-to-one mapping to the cells in the set of cells. The UE further includes a processor operably coupled to the transceiver. The processor is configured to determine first TCI states, from the combination of TCI states, having a one-to-one mapping with the first cells. The transceiver is further configured to receive the first PDSCHs, or second PDSCHs after the first PDSCHs, on the first cells based on the first TCI states, respectively.

In yet another embodiment, a base station is provided. The base station includes a transceiver configured to transmit first information for a set of cells, second information for a respective set of TCI states associated with each cell in the set of cells, respectively, and a first PDCCH that provides a first DCI format. The first DCI format schedules transmissions of first PDSCHs on respective first cells from the set of cells. The first DCI format includes a first TCI field indicating a combination of TCI states. The combination of TCI states includes a number of TCI states that is equal to a number of cells in the set of cells. The TCI states in the combination of TCI states have a one-to-one mapping to the cells in the set of cells. The base station further includes a processor operably coupled to the transceiver. The processor is configured to determine first TCI states, from the combination of TCI states, having a one-to-one mapping with the first cells. The transceiver is further configured to transmit the first PDSCHs, or second PDSCHs after the first PDSCHs, on the first cells based on the first TCI states, respectively.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a flow chart of a method for TCI state determination for co-scheduled PDSCHs or PUSCHs in accordance with various embodiments of the present disclosure;

FIG. 7 illustrates a flow chart of a method for TCI state indication by an MC-DCI format in relation to lists of cells for simultaneous TCI updates in accordance with various embodiments of the present disclosure.

DETAILED DESCRIPTION

Figure 1:
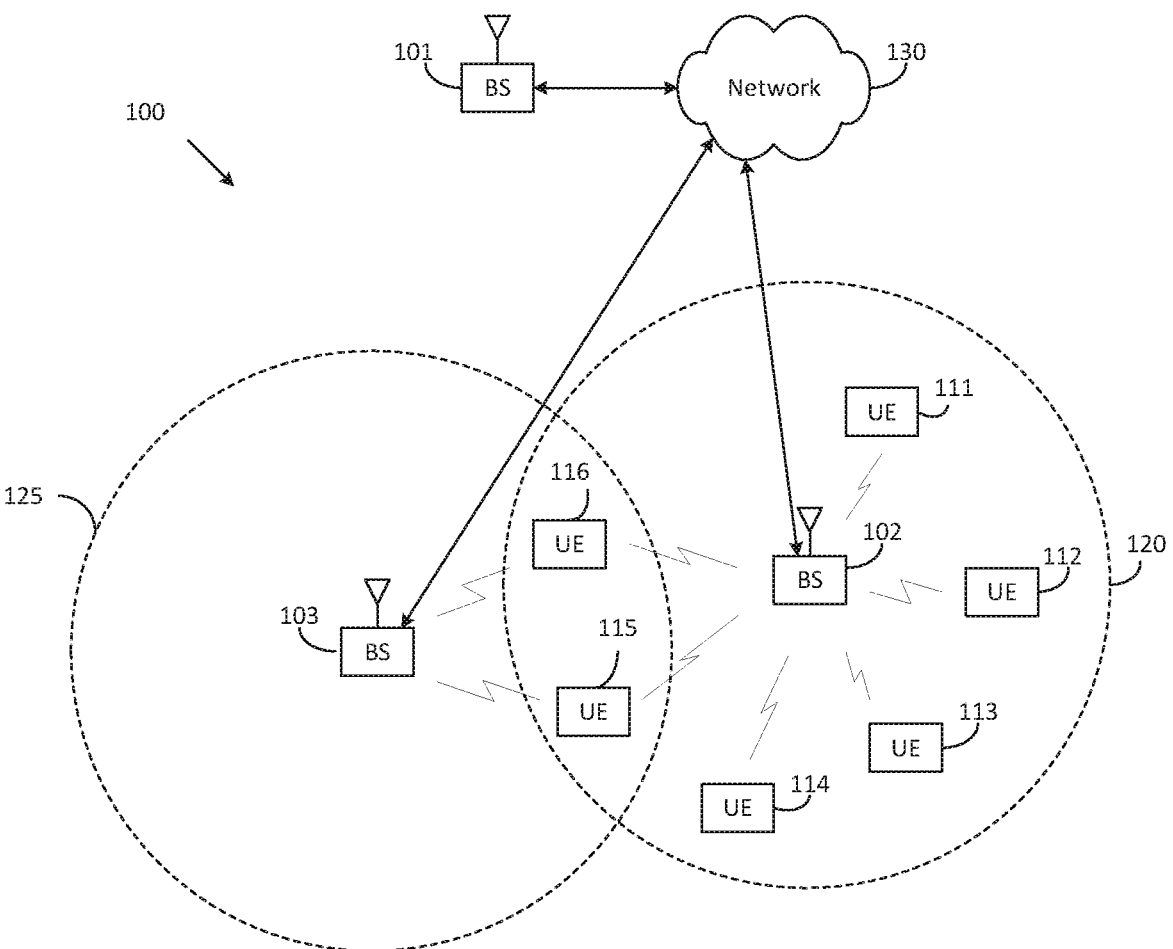
FIG. 1 illustrates an example wireless network according to embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 Rel-16 v17.2.0, "NR; Physical channels and modulation" (herein "REF 1"); 3GPP TS 38.212 Rel-16 v17.2.0, "NR; Multiplexing and channel coding" (herein "REF 2"); 3GPP TS 38.213 Rel-16 v17.2.0, "NR; Physical layer procedures for control" (herein "REF 3"); 3GPP TS 38.214 Rel-16 v17.2.0, "NR; Physical layer procedures for data" (herein "REF 4"); 3GPP TS 38.321 Rel-16 v17.1.0, "NR; Medium Access Control (MAC) protocol specification" (herein "REF 5"); 3GPP TS 38.331 Rel-16 v17.1.0, "NR; Radio Resource Control (RRC) protocol specification" (herein "REF 6"); 3GPP TS 38.300 Rel-16 v17.1.0, "NR; NR and NG-RAN Overall Description; Stage 2" (herein "REF 7").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
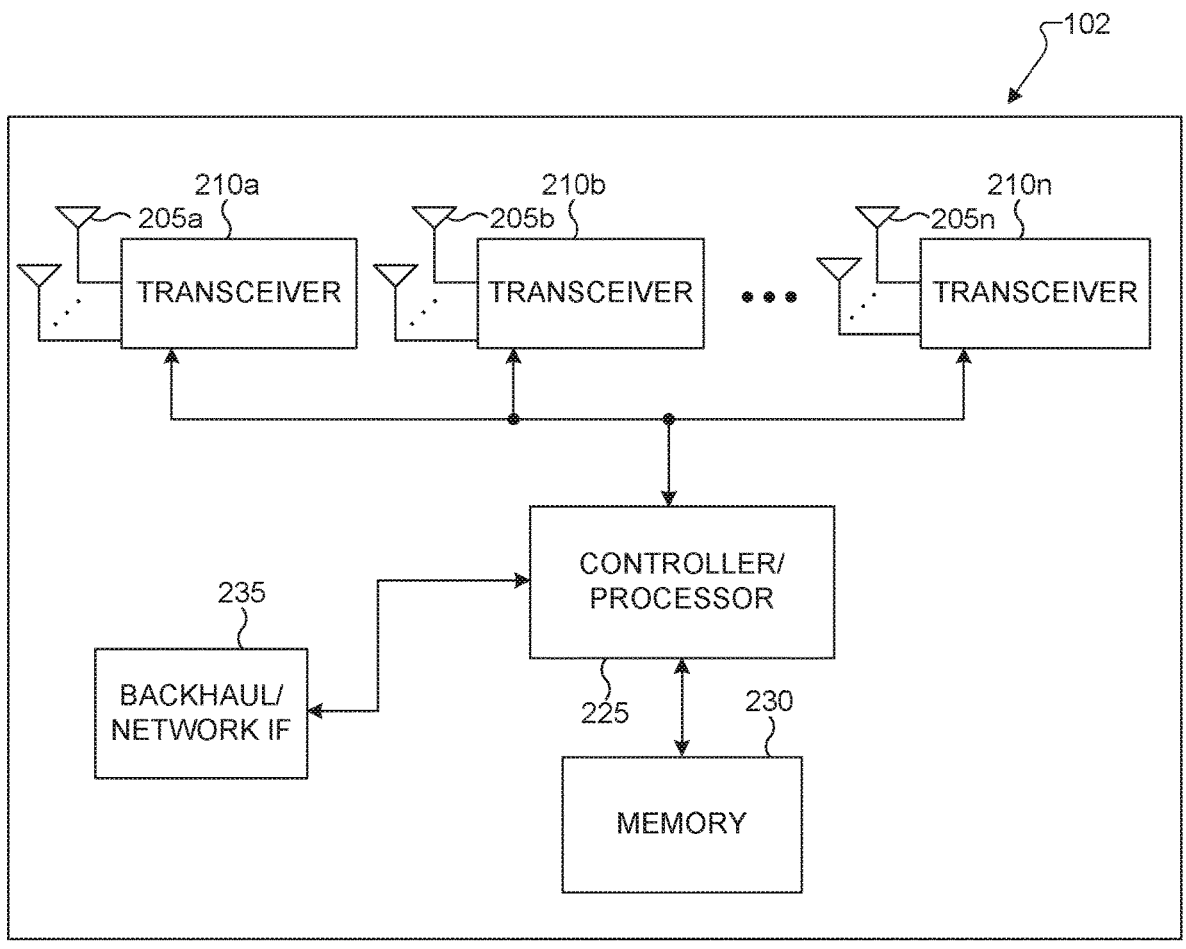
FIG. 2 illustrates an example base station according to embodiments of the present disclosure.
Figure 3:
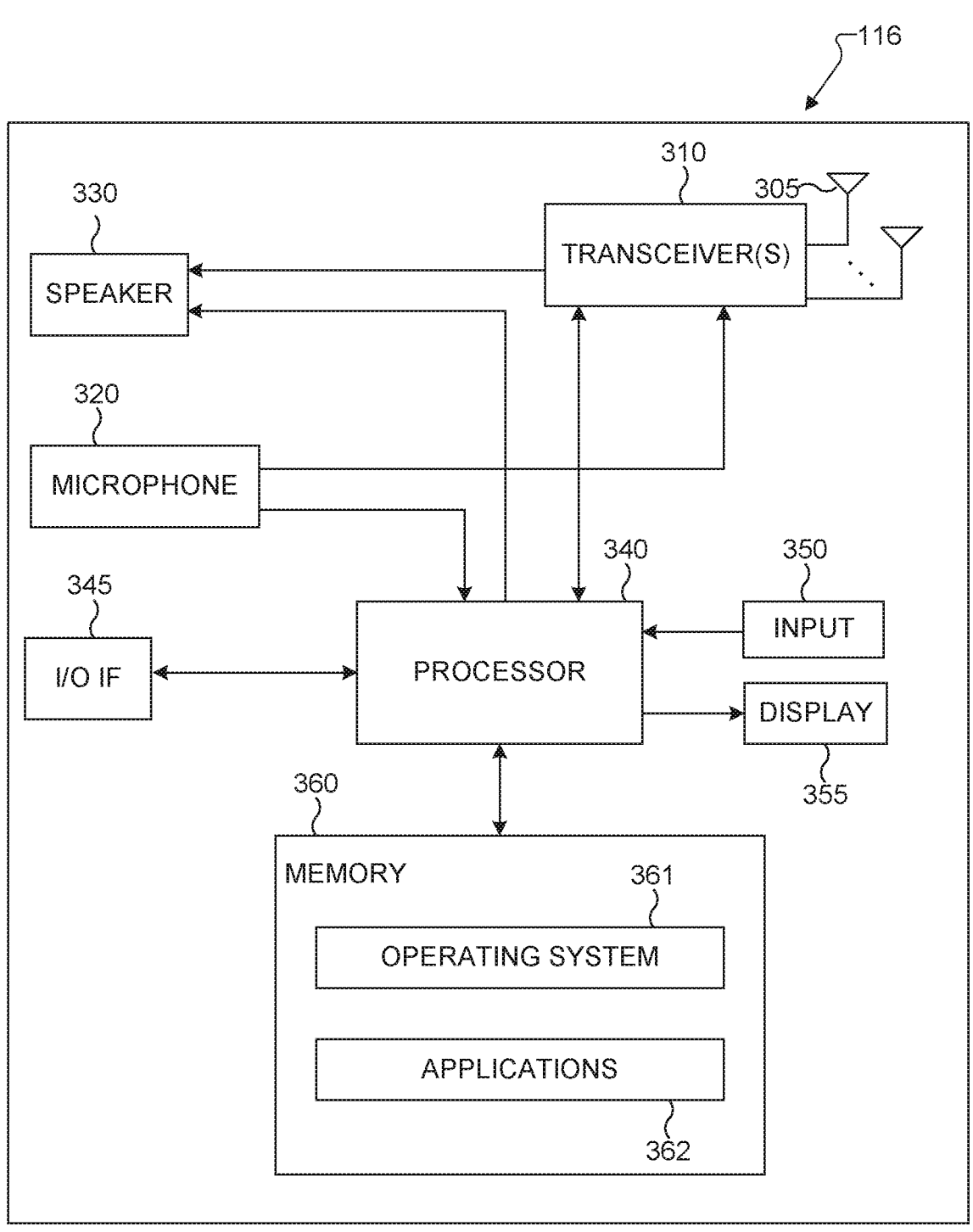
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3 rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As described in greater detail below, any of the gNBs (e.g., 101, 102, 103, etc.) may communicate with a UE (e.g., 111, 112, 113, etc.) in a multi-beam operation for multi-cell scheduling. Similarly, any of the UEs may perform multi-beam operations using multi-cell scheduling.

FIG. 2 illustrates an example base station (e.g., gNB 102) according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

In aspects, the transceivers may transmit to a UE an MC-DCI format to provide full or partial information for values of cell-common and cell specific fields for scheduling PDSCH receptions or PUSCH transmission as described herein. The transceivers may transmit MC-DCI formats that include one or multiple values for a TCI state field.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230. For example, the processor 225 may support scheduling processes in a multi-beam operation for multi-cell scheduling. The controller/processor 225 can move data into or out of the memory 230 as required by an executing process. For example, the processor may be configured to implement at least portions of the methods 600, 700, or 800 stored as instructions in memory 230.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

In aspects, the transceivers may receive an MC-DCI format to provide full or partial information for values of cell-common and cell specific fields for scheduling PDSCH receptions or PUSCH transmission as described herein. The transceivers may receive MC-DCI formats that include one or multiple values for a TCI state field. A UE may determine whether the MC-DCI includes a TCI state field.

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for supporting a multi-beam operation for multi-cell scheduling. The processor 340 can move data into or out of the memory 360 as required by an executing process. In some embodiments, the processor 340 is configured to execute the applications 362 based on the OS 361 or in response to signals received from gNBs or an operator. For example, in various embodiments, the UE 116 may perform multi-beam operations using multi-cell scheduling. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
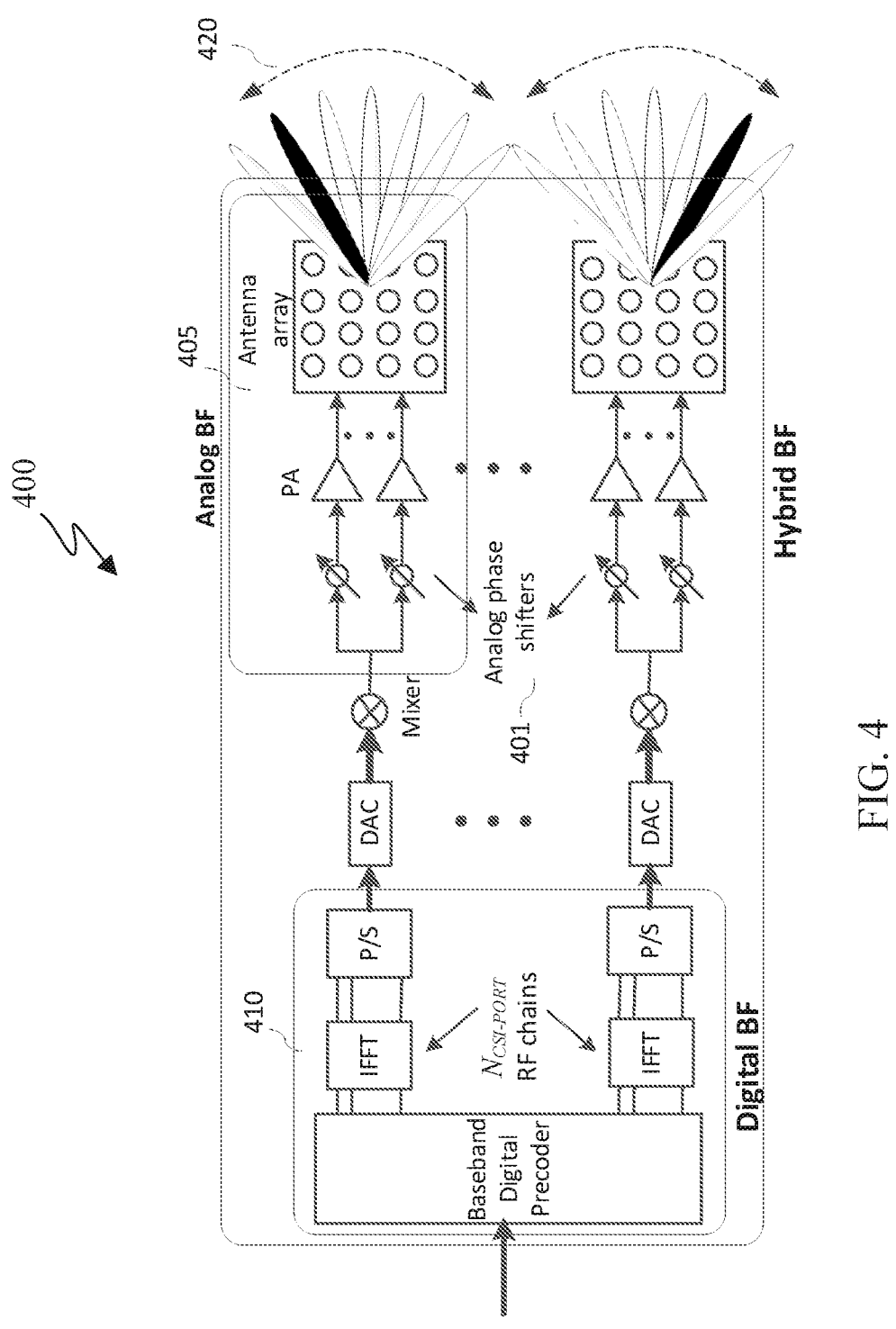
FIG. 4 illustrates an example antenna blocks or arrays forming beams according to embodiments of the present disclosure.

FIG. 4 illustrates an example antenna blocks or arrays 400 according to embodiments of the present disclosure. For example, in various embodiments, the antenna blocks or arrays 400 may be implemented in any of the gNBs 101-103, the TRP 200, and/or the UEs 111-116. The embodiment of the antenna blocks or arrays 400 illustrated in FIG. 4 is for illustration only. FIG. 4 does not limit the scope of this disclosure to any particular implementation of the antenna blocks or arrays.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port.

For FR2, e.g., mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 4. In this case, one CSI-RS port is mapped onto a large number of antenna elements which can be controlled by a bank of analog phase shifters 401. One CSI-RS port can then correspond to one sub-array which produces a narrow analog beam through analog beamforming 1005. This analog beam can be configured to sweep across a wider range of angles 1020 by varying the phase shifter bank across symbols or subframes. The number of sub-arrays (equal to the number of RF chains) is the same as the number of CSI-RS ports $N_{CSI-PORT}$. A digital beamforming unit 1010 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Multi-beam operation of the antenna blocks or array 400 is enabled by spatial filters applied to signals and channels. One example of a spatial filter is a transfiguration configuration indication (TCI). In aspects, the beams transmit the MC-DCI format with the TCI state/deactivation MAC CE to the UE. The TCI field may be absent or present in the MC-DCI. When absent, the UE may determine a TCI state for the so-scheduled cells based on most recent TCI states indicated individually for each cell from the set of co-scheduled cells.

The above system is also applicable to higher frequency bands such as FR2-2, e.g., >52.6 GHz. In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

In some examples, the term 'beam' is used to refer to a spatial filter for transmission or reception of a signal or a channel. For example, a beam (of an antenna) can be a main lobe of the radiation pattern of an antenna array, or a sub-array or an antenna panel, or of multiple antenna arrays, sub-arrays or panels combined, that are used for such transmission or reception.

Throughout the present disclosure, the term "configuration" or "higher layer configuration" and variations thereof (such as "configured" and so on) are used to refer to one or more of: a system information signaling such as by a MIB or a SIB (such as SIB 1), a common or cell-specific higher layer/RRC signaling, or a dedicated or UE-specific or BWP-specific higher layer/RRC signaling.

The present disclosure considers enhancements for cross-carrier scheduling operation in a carrier aggregation (CA) framework to support joint scheduling of multiple cells.

The present disclosure recognizes that in earlier 5G NR systems, a downlink or uplink data transmission can be scheduled only for a single serving cell. In other words, a DCI format provides scheduling information parameters for a PDSCH or a PUSCH on a single serving cell. If the serving cell is a scheduled cell, the UE receives a DCI format for the PDSCH/PUSCH in a PDCCH that the UE receives on a corresponding scheduling cell. Based on a carrier indication field (CIF) in the DCI format, the UE can determine a serving cell on which the UE can receive the PDSCH or transmit the PUSCH.

However, as this disclosure recognizes, earlier 5G NR systems do not support joint scheduling of multiple PDSCHs or multiple PUSCH on multiple cells using a single/common control signaling, such as by using a single DCI format. For such operation, the UE receives multiple DCI formats, wherein each DCI format can schedule one of the multiple PDSCHs or PUSCHs. Such operation achieves the intended outcome, but with high signaling overhead. In various scenarios, it is possible that several scheduling parameters or corresponding UE operations are shared/common among the multiple PDSCHs or PUSCHs on the jointly scheduled cells, referred to as co-scheduled cells.

For example, the UE may use a same PUCCH resource to transmit HARQ-ACK feedback corresponding to the multiple PDSCHs. Therefore, an indication for the same PUCCH resource (and corresponding operations for PUCCH transmission) may be unnecessarily repeated multiple times. In addition, in some scenarios, such as intra-band CA, it is likely that physical channel conditions are correlated, so various scheduling parameters pertaining link adaptation, MIMO/beamforming operation, and even possibly resource allocation can be common and repeated among the co-scheduled cells. Such unnecessary overhead in control signaling can be significant, especially when the number of co-scheduled cells are large, such as 4-8 cells. Further, cyclic redundancy check (CRC) field detection needs to be repeated multiple times, which incurs significant signaling overhead, especially for a large number of co-scheduled cells.

Multi-beam operation is utilized in operation of higher frequency bands, such as millimeter bands FR2-1 and FR2-2. Multi-beam operation is enabled by spatial filters applied to signals and channels transmitted or received by the UE based on gNB indication, such as by indication of transmission configuration indication (TCI) state. Rel-17 unified TCI framework provides a setting in which a UE applies an indicated TCI state to all control and data channels following the TCI state indication, for the downlink direction (DL TCI state) or the uplink direction (UL TCI state) or both downlink and uplink directions (joint DL/UL TCI state).

It should be clarified whether and how the unified TCI framework applies to multi-cell scheduling. For example, the UE needs to determine which beam/TCI state to apply to PDSCHs or PUSCHs that are jointly scheduled by a multi-cell scheduling DCI (MC-DCI) format. In addition, the UE needs to determine whether an MC-DCI can include a TCI state indication or not, and when the MC-DCI includes a TCI state indication, the UE needs to determine how to apply the indicated TCI state. For example, the UE needs to determine cells to which the indicated TCI state is applied, when the TCI state indication is provided by an MC-DCI format.

Therefore, as this disclosure addresses in various embodiments, there is a need for multi-cell scheduling, wherein multiple cells can be jointly scheduled using reduced signaling overhead, such as by using only a single DCI format.

As addressed by embodiments of this disclosure, there is another need to achieve multi-cell scheduling using a reasonable DCI format size, possibly same as a legacy DCI format size or slightly larger, while at the same time, scheduling flexibility is reasonably maintained compared to a scenario with multiple separate DCI formats for each cell.

As addressed by more embodiments of this disclosure, there is a further need to take into account a number of co-scheduled cells and a relative similarity of channel/radio conditions among the co-scheduled cells, when designing a method for multi-cell scheduling.

This disclosure also addresses an additional need to determine TCI states applicable to co-scheduled PDSCHs or PUSCHs, and also determine how to apply TCI states provided an MC-DCI format.

The present disclosure provides methods and apparatus for multi-beam operation for multi-cell scheduling. One motivation for multi-cell scheduling using a single DCI format is enhanced cross-carrier scheduling operation for larger number of cells, such as 4-8 cells, operating in an intra-band CA framework in frequency bands below 6 GHz or above 6 GHz, referred to as FR1 or FR2, respectively. In general, the embodiments apply to any deployments, verticals, or scenarios including inter-band CA, with eMBB, URLLC and IIoT and extended reality (XR), mMTC and IoT, with sidelink/V2X communications, with multi-TRP/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, and so on.

Embodiments of the disclosure are summarized in the following and are fully elaborated further below. Combinations of the embodiments are also applicable, but they are not described in detail for brevity.

Various embodiments of the present disclosure provide for a multi-cell scheduling operation. A UE can be provided a number of sets of co-scheduled cells by higher layers. The term set of co-scheduled cells is used to refer to a set of serving cells wherein the UE can be scheduled PDSCH receptions or PUSCH transmissions on two or more cells from the set of co-scheduled cells jointly by a single DCI format, or by using complementary methods such as those described below (e.g., under Mechanism for multi-cell scheduling). For convenience of presentation, such DCI format may be referred to as a multi-cell scheduling DCI (MC-DCI) format. The MC-DCI format can be a new DCI format, such as DCI format 0_3 for co-scheduled PUSCHs or 1_3 for co-scheduled PDSCHs. Additionally, the UE can be indicated via a DCI format, such as the MC-DCI format, in a PDCCH or via a MAC CE in a PDSCH a subset of a set of co-scheduled cells, wherein cells of the subset can change across different PDCCH monitoring occasions (MOs). For example, a first MC-DCI format in a first MO can indicate a first set/subset of co-scheduled cells, and a second DCI format in a second MO can indicate a second set/subset of co-scheduled cells.

Various embodiments of the present disclosure provide for mechanisms for multi-cell scheduling. For a UE that is configured with a set of co-scheduled cells, a DCI format for multi-cell scheduling can provide full or partial information for values of cell-common and cell-specific fields for scheduling PDSCH receptions or PUSCH transmissions on respective two or more cells from the set of co-scheduled cells. When the DCI format provides partial information, the UE can determine remaining information from RRC signaling or by using other complementary methods.

Various embodiments of the present disclosure provide for a TCI field absent in multi-cell scheduling DCI (MC-DCI) format. In more embodiments, an MC-DCI format does not include a field for indication of TCI state. Accordingly, the UE determines a TCI state for the co-scheduled cells by an MC-DCI format based on most recent TCI states indicated individually for each cell from the set of co-scheduled cells by single-cell scheduling DCI (SC-DCI) formats. The UE may require, based on UE capability, a minimum processing time or application time among the MC-DCI format and the most recent SC-DCI formats providing the TCI states.

Various embodiments of the present disclosure provide for a TCI field present in multi-cell scheduling DCI (MC-DCI) format. In more embodiments, an MC-DCI format can include one or multiple values for a TCI state field, wherein each value corresponds to a cell or a group of cells from the set of co-scheduled cells by the MC-DCI format. In aspects, the value(s) for the TCI state field correspond to TCI states configured/activated for a number of lists of cells configured for simultaneous TCI state update, and the number of values for the TCI state field in the MC-DCI state is based on the number of lists of cells for simultaneous TCI state update. In other aspects, the MC-DCI format can include a value for the TCI state field, wherein the value is from a set of configured/activated reference TCI states on a reference cell. In further aspects, the multiple TCI state indications corresponding to different cells or groups of cells from the set of co-scheduled cells can be provided using multiple separate values in the MC-DCI format, or using a single value based on a joint multi-cell TCI state mapping or table. In one example, when the MC-DCI format includes multiple TCI state indications, the MC-DCI format can include a single TCI state field with multiple values, or can include multiple TCI state fields each with a separate value corresponding to one of the indicated TCI states.

Various embodiments of the present disclosure provide for a determination of the presence or absence of TCI field in MC-DCI format. In more embodiments, the UE determines whether an MC-DCI format includes or does not include a TCI state field based on the specifications for system operation or based on higher layer configuration. Additionally, the MC-DCI format can include an indication, such as a 1-bit flag, that indicates whether the UE needs to apply, for the TCI state of the co-scheduled cells, a value provided by a most recent SC-DCI format (or a most recent MC-DCI format) or a reference value configured or activated by higher layers, such as RRC or MAC CE, on a reference cell.

In various embodiments, the UE (e.g., 111, 112, 113) can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-co-location relationship between one or two downlink reference signals and the DM-RS ports of the PDSCH, the DM-RS port of PDCCH or the CSI-RS port(s) of a CSI-RS resource. The quasi-co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi-co-location types corresponding to each DL RS are given by the higher layer parameter qcl-Type in QCL-Info and may take one of the following values:

'typeA': {Doppler shift, Doppler spread, average delay, delay spread}
'typeB': {Doppler shift, Doppler spread}
'typeC': {Doppler shift, average delay}
'typeD': {Spatial Rx parameter}.

The UE can be configured with a list of up to 128 DLorJointTCIState configurations, within the higher layer parameter PDSCH-Config for providing a reference signal for the quasi co-location for DM-RS of PDSCH and DM-RS of PDCCH in a component carrier (CC), for CSI-RS, and to provide a reference, if applicable, for determining UL TX spatial filter for dynamic-grant and configured-grant based PUSCH and PUCCH resource in a CC, and SRS.

If the DLorJointTCIState or UL-TCIState configurations are absent in a BWP of the CC, the UE can apply the DLorJointTCIState or UL-TCIState configurations from a reference BWP of a reference CC. The UE is not expected to be configured with TCI-State, SpatialRelationInfo or PUCCH-SpatialRelationInfo, except SpatialRelationInfo-Pos in a CC in a band, if the UE is configured with DLorJointTCIState or UL-TCIState in any CC in the same band. The UE can assume that when the UE is configured with TCI-State in any CC in the CC list configured by simultaneousTCI-UpdateList1-r16, simultaneousTCI-UpdateList2-r16, simultaneousSpatial-UpdatedList1-r16, or simultaneousSpatial-UpdatedList2-r16, the UE is not configured with DLorJointTCIState or UL-TCIState in any CC within the same band in the CC list.

The UE receives an activation command, as described in clause 6.1.3.14 of REF 5 at [10, TS 38.321] or 6.1.3.x of REF 5 at [10, TS 38.321], used to map up to 8 TCI states and/or pairs of TCI states, with one TCI state for DL channels/signals and one TCI state for UL channels/signals to the codepoints of the DCI field 'Transmission Configuration Indication' for one or for a set of CCs/DL BWPs, and if applicable, for one or for a set of CCs/UL BWPs. When a set of TCI state IDs are activated for a set of CCs/DL BWPs and if applicable, for a set of CCs/UL BWPs, where the applicable list of CCs is determined by the indicated CC in the activation command, the same set of TCI state IDs are applied for all DL and/or UL BWPs in the indicated CCs.

Figure 5:
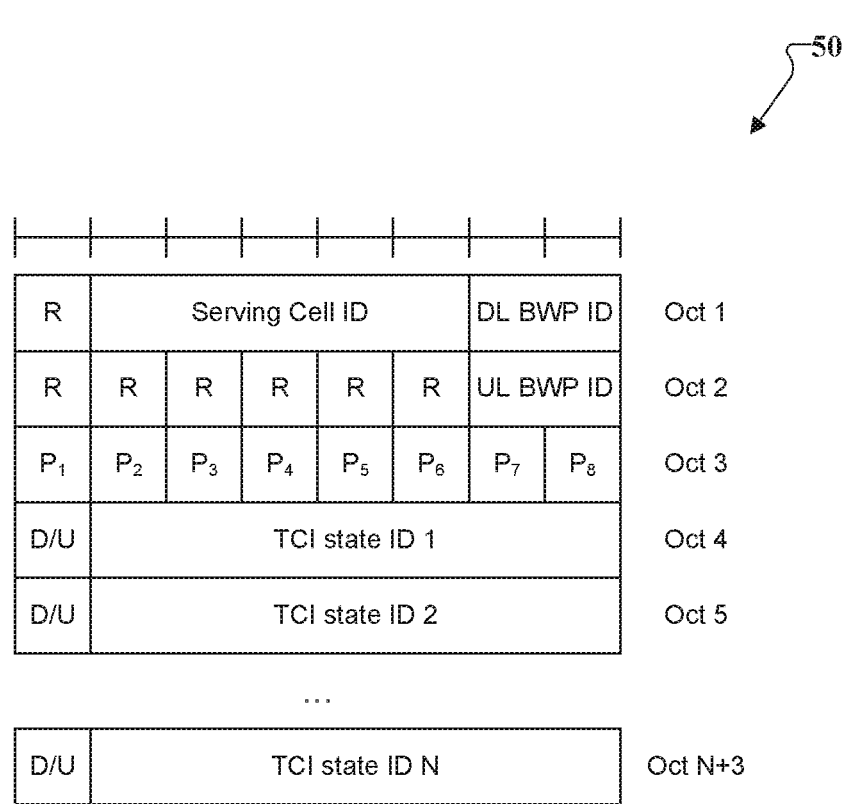
FIG. 5 illustrates a diagram of a formatted message unified TCI state activation/deactivation MAC CE that may be utilized in accordance with various embodiments of the present disclosure.

FIG. 5 illustrates a diagram of a formatted message 500 that illustrates unified TCI state activation/deactivation MAC CE that may be utilized in accordance with various embodiments of the present disclosure. For example, the unified TCI state activation/deactivation MAC CE may be sent by a base station 102 to a UE 116 for multi-beam operation for multi-cell scheduling. FIG. 5 is for illustration and not intended as a limitation on the types of formatted message unified TCI state activation/deactivation MAC CEs that can be utilized in embodiments of the present disclosure.

With reference to FIG. 5, the Unified TCI States Activation/Deactivation MAC CE is identified by a MAC sub-header with eLCID as specified in Table 6.2.1-1b of TS 38.321 (REF 5). It has a variable size comprising of the following fields:

Serving Cell ID: This field indicates the identity of the Serving Cell for which the MAC CE applies. The length of the field is 5 bits. If the indicated Serving Cell is configured as part of a simultaneousU-TCI-UpdateList1, simultaneousU-TCI-UpdateList2, simultaneousU-TCI-UpdateList3 or simultaneousU-TCI-UpdateList4 as specified in TS 38.331 (REF 6), this MAC CE applies to all the Serving Cells in the set simultaneousU-TCI-UpdateList1, simultaneousU-TCI-UpdateList2, simultaneousU-TCI-UpdateList3 or simultaneousU-TCI-UpdateList4, respectively;

DL BWP ID: This field indicates a DL BWP for which the MAC CE applies as the codepoint of the DCI band-width part indicator field as specified in TS 38.212 (REF 2). The length of the BWP ID field is 2 bits;

UL BWP ID: This field indicates a UL BWP for which the MAC CE applies as the codepoint of the DCI band-width part indicator field as specified in TS 38.212 (REF 1). The length of the BWP ID field is 2 bits;

Pi: This field indicates whether each TCI codepoint has multiple TCI states or single TCI state. If Pi field set to 1, it indicates that ith TCI codepoint includes the DL TCI state and the UL TCI state. If Pi field set to 0, it indicates that ith TCI codepoint includes only the DL TCI state or the UL TCI state;

D/U: This field indicate whether the TCI state ID in the same octet is for joint/downlink or uplink TCI state. If this field is set to 1, the TCI state ID in the same octet is for joint/downlink. If this field is set to 0, the TCI state ID in the same octet is for uplink;

TCI state ID: This field indicates the TCI state identified by TCI-StateId as specified in TS 38.331 (REF 6). If D/U is set to 1, 7-bits length TCI state ID i.e., TCI-StateId as specified in TS 38.331 (REF 6) is used. If D/U is set to 0, the most significant bit of TCI state ID is considered as the reserved bit and remainder 6 bits indicate the UL-TCIState-Id as specified in TS 38.331 (REF 6). The maximum number of activated TCI states is 16;

R: Reserved bit, set to 0.

With additional reference to Table 1 below, which illustrates an example CellGroupConfig information element (IE), the CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells).

TABLE 1

Example of CellGroupConfig information element (IE)

-- ASN1START
-- TAG-CELLGROUPCONFIG-START
-- Configuration of one Cell-Group:

TABLE 1-continued

Example of CellGroupConfig information element (IE)

```
CellGroupConfig ::=              SEQUENCE {
cellGroupId                 CellGroupId,
rlc-BearerToAddModList              SEQUENCE (SIZE(1..maxLC-ID)) OF RLC-BearerConfig
OPTIONAL,  -- Need N
rlc-BearerToReleaseList         SEQUENCE (SIZE(1..maxLC-ID)) OF LogicalChannelIdentity
OPTIONAL,  -- Need N
mac-CellGroupConfig            MAC-CellGroupConfig                   OPTIONAL,
-- Need M
physicalCellGroupConfig          PhysicalCellGroupConfig                OPTIONAL,
-- Need M
spCellConfig                SpCellConfig                    OPTIONAL,
-- Need M
sCellToAddModList               SEQUENCE (SIZE (1..maxNrofSCells)) OF SCellConfig
OPTIONAL,  -- Need N
sCellToReleaseList              SEQUENCE (SIZE (1..maxNrofSCells)) OF SCellIndex
OPTIONAL,  -- Need N
...,
[[
reportUplinkTxDirectCurrent        ENUMERATED {true}                    OPTIONAL
-- Cond BWP-Reconfig
]],
]]
bap-Address-r16             BIT STRING (SIZE (10))                OPTIONAL,
-- Need M
bh-RLC-ChannelToAddModList-r16              SEQUENCE (SIZE(1..maxBH-RLC-ChannelID-r16))
OF BH-RLC-ChannelConfig-r16 OPTIONAL,   -- Need N
bh-RLC-ChannelToReleaseList-r16             SEQUENCE (SIZE(1..maxBH-RLC-ChannelID-r16))
OF BH-RLC-ChannelID-r16    OPTIONAL,  -- Need N
f1c-TransferPath-r16         ENUMERATED {lte, nr, both}             OPTIONAL,
-- Need M
simultaneousTCI-UpdateList1-r16            SEQUENCE (SIZE (1..maxNrofServingCellsTCI-r16))
OF ServCellIndex   OPTIONAL,       -- Need R
simultaneousTCI-UpdateList2-r16            SEQUENCE (SIZE (1..maxNrofServingCellsTCI-r16))
OF ServCellIndex   OPTIONAL,       -- Need R
simultaneousSpatial-UpdatedList1-r16        SEQUENCE (SIZE (1..maxNrofServingCellsTCI-r16))
OF ServCellIndex   OPTIONAL,       -- Need R
simultaneousSpatial-UpdatedList2-r16        SEQUENCE (SIZE (1..maxNrofServingCellsTCI-r16))
OF ServCellIndex   OPTIONAL,       -- Need R
uplinkTxSwitchingOption-r16                 ENUMERATED   {switchedUL,  dualUL}
OPTIONAL,  -- Need R
uplinkTxSwitchingPowerBoosting-r16            ENUMERATED        {enabled}
OPTIONAL   -- Need R
]],
[[
reportUplinkTxDirectCurrentTwoCarrier-r16           ENUMERATED           {true}
OPTIONAL   -- Need N
]],
[[
f1c-TransferPathNRDC-r17                    ENUMERATED {mcg, scg, both}
OPTIONAL,  -- Need M
uplinkTxSwitching-2T-Mode-r17                   ENUMERATED  {enabled}
OPTIONAL,  -- Cond 2Tx
uplinkTxSwitching-DualUL-TxState-r17            ENUMERATED  {oneT, twoT}
OPTIONAL,  -- Cond 2Tx
uu-RelayRLC-ChannelToAddModList-r17             SEQUENCE (SIZE(1..maxUu-RelayRLC-
ChannelID-r17)) OF Uu-RelayRLC-ChannelConfig-r17
OPTIONAL,  -- Need N
uu-RelayRLC-ChannelToReleaseList-r17            SEQUENCE (SIZE(1..maxUu-RelayRLC-
ChannelID-r17)) OF Uu-RelayRLC-ChannelID-r17
OPTIONAL,  -- Need N
simultaneousU-TCI-UpdateList1-r17          SEQUENCE (SIZE (1..maxNrofServingCellsTCI-r16))
OF ServCellIndex   OPTIONAL,       -- Need R
simultaneousU-TCI-UpdateList2-r17          SEQUENCE (SIZE (1..maxNrofServingCellsTCI-r16))
OF ServCellIndex   OPTIONAL,       -- Need R
simultaneousU-TCI-UpdateList3-r17          SEQUENCE (SIZE (1..maxNrofServingCellsTCI-r16))
OF ServCellIndex   OPTIONAL,       -- Need R
simultaneousU-TCI-UpdateList4-r17          SEQUENCE (SIZE (1..maxNrofServingCellsTCI-r16))
OF ServCellIndex   OPTIONAL,       -- Need R
rlc-BearerToReleaseListExt-r17                      SEQUENCE (SIZE(1..maxLC-ID)) OF
LogicalChannelIdentityExt-r17        OPTIONAL,       -- Need N
iab-ResourceConfigToAddModList-r17           SEQUENCE (SIZE(1..maxNrofIABResourceConfig-
r17)) OF IAB-ResourceConfig-r17   OPTIONAL, -- Need N
iab-ResourceConfigToReleaseList-r17 SEQUENCE (SIZE(1..maxNrofIABResourceConfig-r17))
OF IAB-ResourceConfigID-r17 OPTIONAL -- Need N
]]
}
```

The simultaneousTCI-UpdateList1 and simultaneousTCI-UpdateList2 are lists of serving cells which can be updated simultaneously for TCI relation with a MAC CE. The simultaneousTCI-UpdateList1 and simultaneousTCI-UpdateList2 may not contain same serving cells. A network generally will not configure serving cells that are configured with a BWP with two different values for the coresetPoolIndex in these lists.

simultaneousU-TCI-UpdateList1, simultaneousU-TCI-UpdateList2, simultaneousU-TCI-UpdateList3, simultaneousU-TCI-UpdateList4 are list of serving cells for which the Unified TCI States Activation/Deactivation MAC CE applies simultaneously, as specified in [TS 38.321 v17.1.0 clause 6.1.3.47]. The different lists may not contain same serving cells. Network only configures in these lists serving cells that are configured with unifiedtci-StateType.

When the bwp-id or cell for QCL-TypeA/D source RS in a QCL-Info of the TCI state configured with DLorJointT-CIState is not configured, the UE assumes that QCL-TypeA/D source RS is configured in the CC/DL BWP where TCI state applies.

When tci-PresentInDCl is set as 'enabled' or tci-PresentDCI-1-2 is configured for the CORESET, the UE with activated DLorJointTCIState or UL-TCIState receives DCI format 1_1/1_2 providing indicated DLorJointTCIState or UL-TCIState for a CC or all CCs in the same CC list configured by simultaneousTCI-UpdateList1-r17, simultaneousTCI-UpdateList2-r17, simultaneousTCI-UpdateList3-r17, simultaneousTCI-UpdateList4-r17. The DCI format 1_1/1_2 can be with or without, if applicable, DL assignment. If the DCI format 1_1/1_2/is without DL assignment, the UE can assume the following:

CS-RNTI is used to scramble the CRC for the DCI

The values of the following DCI fields are set as follows:

RV=all '1's

MCS=all '1's

NDI=0

Set to all '0's for FDRA Type 0, or all '1's for FDRA Type 1, or all '0's for dynamicSwitch (same as in Table 10.2-4 of REF 3 at [6, TS 38.213]).

After a UE receives an initial higher layer configuration of more than one DLorJoint-TCIState and before application of an indicated TCI state from the configured TCI states, the UE assumes that DM-RS of PDSCH and DM-RS of PDCCH and the CSI-RS applying the indicated TCI state are quasi co-located with the SS/PBCH block the UE identified during the initial access procedure.

After a UE receives an initial higher layer configuration of more than one DLorJoint-TCIState or UL-TCIState and before application of an indicated TCI state from the configured TCI states, the UE assumes that the UL TX spatial filter, if applicable, for dynamic-grant and configured-grant based PUSCH and PUCCH, and for SRS applying the indicated TCI state, is the same as that for a PUSCH transmission scheduled by a RAR UL grant during the initial access procedure.

After a UE receives a higher layer configuration of more than one DLorJoint-TCIState as part of a Reconfiguration with sync procedure as described in [12, TS 38.331] and before applying an indicated TCI state from the configured TCI states, the UE assumes that DM-RS of PDSCH and DM-RS of PDCCH, and the CSI-RS applying the indicated TCI state are quasi co-located with the SS/PBCH block or the CSI-RS resource the UE identified during the random access procedure initiated by the Reconfiguration with sync procedure as described in REF 6 [12, TS 38.331].

After a UE receives a higher layer configuration of more than one DLorJoint-TCIState or UL-TCIState as part of a Reconfiguration with sync procedure as described in [12, TS 38.331] and before applying an indicated TCI state from the configured TCI states, the UE assumes that the UL TX spatial filter, if applicable, for dynamic-grant and configured-grant based PUSCH and PUCCH, and for SRS applying the indicated TCI state, is the same as that for a PUSCH transmission scheduled by a RAR UL grant during random access procedure initiated by the Reconfiguration with sync procedure as described in REF 6 [12, TS 38.331].

If a UE receives a higher layer configuration of a single DLorJoint-TCIState, that can be used as an indicated TCI state, the UE obtains the QCL assumptions from the configured TCI state for DM-RS of PDSCH and DM-RS of PDCCH, and the CSI-RS applying the indicated TCI state.

If a UE receives a higher layer configuration of a single DLorJoint-TCIState or UL-TCIState, that can be used as an indicated TCI state, the UE determines an UL TX spatial filter, if applicable, from the configured TCI state for dynamic-grant and configured-grant based PUSCH and PUCCH, and SRS applying the indicated TCI state.

When the UE would transmit the last symbol of a PUCCH with HARQ-ACK information corresponding to the DCI carrying the TCI State indication and without DL assignment, or corresponding to the PDSCH scheduling by the DCI carrying the TCI State indication, and if the indicated TCI State is different from the previously indicated one, the indicated DLorJointTCIState or UL-TCIstate should be applied starting from the first slot that is at least BeamApp-Time_r17 symbols after the last symbol of the PUCCH. The first slot and the BeamAppTime_r17 symbols are both determined on the carrier with the smallest SCS among the carrier(s) applying the beam indication.

If a UE is configured with pdsch-TimeDomainAllocation-ListForMultiPDSCH-r17 in which one or more rows contain multiple SLIVs for PDSCH on a DL BWP of a serving cell, and the UE is receiving a DCI carrying the TCI-State indication and without DL assignment, the UE does not expect that the number of indicated SLIVs in the row of the pdsch-TimeDomainAllocationListForMultiPDSCH-r17 by the DCI is more than one.

If the UE is configured with [NumberOfAdditionalPCI] and with PDCCH-Config that contains two different values of coresetPoolIndex in ControlResourceSet, the UE receives an activation command for CORESET associated with each coresetPoolIndex, as described in clause 6.1.3.14 of REF 5 [10, TS 38.321], used to map up to 8 TCI states to the codepoints of the DCI field 'Transmission Configuration Indication' in one CC/DL BWP. When a set of TCI state IDs are activated for a coresetPoolIndex, the activated TCI states corresponding to one coresetPoolIndex can be associated with one physical cell ID and activated TCI states corresponding to another coresetPoolIndex can be associated with another physical cell ID.

When a UE supports two TCI states in a codepoint of the DCI field 'Transmission Configuration Indication' the UE may receive an activation command, as described in clause 6.1.3.24 of REF 5 [10, TS 38.321], the activation command is used to map up to 8 combinations of one or two TCI states to the codepoints of the DCI field 'Transmission Configuration Indication'. The UE is not expected to receive more than 8 TCI states in the activation command.

When the DCI field 'Transmission Configuration Indication' is present in DCI format 1_2 and when the number of codepoints S in the DCI field 'Transmission Configuration Indication' of DCI format 1_2 is smaller than the number of TCI codepoints that are activated by the activation command, as described in clause 6.1.3.14 and 6.1.3.24 of REF 5 [10, TS38.321], only the first S activated codepoints are applied for DCI format 1_2.

When the UE would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after slot $$n + 3N_{slot}^{subframe,\mu} + \frac{2^\mu}{2^{\mu K} mac} \cdot k_{mac}$$

where m is the SCS configuration for the PUCCH and $\mu_{K_{mac}}$ is the subcarrier spacing configuration for $k_{mac}$ with a value of 0 for frequency range 1, and $k_{mac}$ is provided by K-Mac or $k_{mac}=0$ if K-Mac is not provided. If tci-PresentInDCl is set to 'enabled' or tci-PresentDCI-1-2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to qcl-Type set to 'typeA', and when applicable, also with respect to qcl-Type set to 'typeD'.

If a UE is configured with the higher layer parameter tci-PresentInDCl that is set as 'enabled' for the CORESET scheduling a PDSCH, the UE assumes that the TCI field is present in the DCI format 1_1 of the PDCCH transmitted on the CORESET. If a UE is configured with the higher layer parameter tci-PresentDCI-1-2 for the CORESET scheduling the PDSCH, the UE assumes that the TCI field with a DCI field size indicated by tci-PresentDCI-1-2 is present in the DCI format 1_2 of the PDCCH transmitted on the CORESET. If the PDSCH is scheduled by a DCI format not having the TCI field present, and the time offset between the reception of the DL DCI and the corresponding PDSCH of a serving cell is equal to or greater than a threshold timeDurationForQCL if applicable, where the threshold is based on reported UE capability [13, TS 38.306], for determining PDSCH antenna port quasi co-location, the UE assumes that the TCI state or the QCL assumption for the PDSCH is identical to the TCI state or QCL assumption whichever is applied for the CORESET used for the PDCCH transmission within the active BWP of the serving cell.

When a UE is configured with both sfnSchemePdcch and sfnSchemePdsch scheduled by DCI format 1_0 or by DCI format 1_1/1_2, if the time offset between the reception of the DL DCI and the corresponding PDSCH of a serving cell is equal to or greater than a threshold timeDurationForQCL if applicable:

if the UE supports DCI scheduling without TCI field, the UE assumes that the TCI state(s) or the QCL assumption(s) for the PDSCH is identical to the TCI state(s) or QCL assumption(s) whichever is applied for the CORESET used for the reception of the DL DCI within the active BWP of the serving cell regardless of the number of active TCI states of the CORESET. If the UE does not support dynamic switching between SFN PDSCH and non-SFN PDSCH, the UE should be activated with the CORESET with two TCI states.
    else if the UE does not support DCI scheduling without TCI field, the UE may expect TCI field present when scheduled by DCI format 1_1/1_2.

When a UE is configured with sfnSchemePdsch and sfnSchemePdcch is not configured, when scheduled by DCI format 1_1/1_2, if the time offset between the reception of the DL DCI and the corresponding PDSCH of a serving cell is equal to or greater than a threshold timeDurationForQCL if applicable, the UE may expect TCI field present.

For PDSCH scheduled by DCI format 1_0, 1_1, 1_2, when a UE is configured with sfnSchemePdcch set to 'sfnSchemeA' and sfnSchemePdsch is not configured, and there is no TCI codepoint with two TCI states in the activation command, and if the time offset between the reception of the DL DCI and the corresponding PDSCH is equal or larger than the threshold timeDurationForQCL if applicable and the CORESET which schedules the PDSCH is indicated with two TCI states, the UE assumes that the TCI state or the QCL assumption for the PDSCH is identical to the first TCI state or QCL assumption which is applied for the CORESET used for the PDCCH transmission within the active BWP of the serving cell.

If a PDSCH is scheduled by a DCI format having the TCI field present, the TCI field in DCI in the scheduling component carrier points to the activated TCI states in the scheduled component carrier or DL BWP, the UE may use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability [13, TS 38.306]. For a single slot PDSCH, the indicated TCI state(s) should be based on the activated TCI states in the slot with the scheduled PDSCH. For a multi-slot PDSCH or the UE is configured with higher layer parameter [pdsch-TimeDomainAllocationListForMultiPDSCH-r17], the indicated TCI state(s) should be based on the activated TCI states in the first slot with the scheduled PDSCH(s), and UE may expect the activated TCI states are the same across the slots with the scheduled PDSCH(s). When the UE is configured with CORESET associated with a search space set for cross-carrier scheduling and the UE is not configured with enableDefaultBeamForCCS, the UE expects tci-PresentInDCl is set as 'enabled' or tci-PresentDCI-1-2 is configured for the CORESET, and if one or more of the TCI states configured for the serving cell scheduled by the search space set contains qcl-Type set to 'typeD', the UE expects the time offset between the reception of the detected PDCCH in the search space set and a corresponding PDSCH is larger than or equal to the threshold timeDurationForQCL.

Independent of the configuration of tci-PresentInDCl and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', the UE may assume at least one of the following:

That the DM-RS ports of PDSCH(s) of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

If a UE is configured with enableDefaultTCI-StatePer-CoresetPoolIndex and the UE is configured by higher layer parameter PDCCH-Config that contains two different values of coresetPoolIndex in different Control-ResourceSets, the UE may assume that the DM-RS ports of PDSCH associated with a value of coreset-PoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coreset-PoolIndex as the PDCCH scheduling that PDSCH, in the latest slot in which one or more CORESETs asso-ciated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same value of coresetPoolIndex, the UE is expected to prioritize the reception of PDCCH associated with that CORESET. This also applies to the intra-band CA case (when PDSCH and the CORESET are in different component carriers).

If a UE is configured with enableTwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states correspond-ing to the lowest codepoint among the TCI codepoints containing two different TCI states. When the UE is configured by higher layer parameter repetitionScheme set to 'tdmSchemeA' or is configured with higher layer parameter repetitionNumber, and the offset between the reception of the DL DCI and the first PDSCH trans-mission occasion is less than the threshold timeDura-tionForQCL, the mapping of the TCI states to PDSCH transmission occasions is determined according to clause 5.1.2.1 by replacing the indicated TCI states with the TCI states corresponding to the lowest code-point among the TCI codepoints containing two differ-ent TCI states based on the activated TCI states in the slot with the first PDSCH transmission occasion. In this case, if the 'QCL-TypeD' in both of the TCI states corresponding to the lowest codepoint among the TCI codepoints containing two different TCI states is dif-ferent from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers).

If a UE is not configured with sfnSchemePdsch, and the UE is configured with sfnSchemePdcch set to 'sfn- SchemeA' and there is no TCI codepoint with two TCI states in the activation command and the CORESET with the lowest ID in the latest slot is indicated with two TCI states, the UE may assume that the DM-RS ports of PDSCH of a serving cell are quasi co-located with the RS(s) with respect to the QCL parameter(s) associated with the first TCI state of two TCI states indicated for the CORESET.

In all cases above, if none of configured TCI states for the serving cell of scheduled PDSCH is configured with qcl-Type set to 'typeD', the UE may obtain the other QCL assumptions from the indicated TCI state(s) for its scheduled PDSCH irrespective of the time offset between the reception of the DL DCI and the corresponding PDSCH.

If the PDCCH carrying the scheduling DCI is received on one component carrier, and a PDSCH scheduled by that DCI is on another component carrier: the timeDurationForQCL is determined based on the subcarrier spacing of the scheduled PDSCH. If $\mu_{PDCCH} < \mu_{PDSCH}$ an additional timing delay $$d \frac{2^{\mu} PDSCH}{2^{\mu} PDCCH}$$

is added to the timeDurationForQCL, where d is defined in 5.2.1.5.1a-1, otherwise d is zero. When the UE is configured with enableDefaultBeamForCCS, if the offset between the reception of the DL DCI and the corresponding PDSCH is less than the threshold time-DurationForQCL, or if the DL DCI does not have the TCI field present, the UE obtains its QCL assumption for the scheduled PDSCH from the activated TCI state with the lowest ID applicable to PDSCH in the active BWP of the scheduled cell.

A UE that has indicated a capability beamCorrespon-denceWithoutUL-BeamSweeping set to '1', as described in [18, TS 38.822], can determine a spatial domain filter to be used while performing the applicable channel access proce-dures described in [16, TS 37.213] to transmit a UL trans-mission on the channel as follows: if UE is indicated with an SRI corresponding to the UL transmission, the UE may use a spatial domain filter that is same as the spatial domain transmission filter associated with the indicated SRI; if UE is configured with TCI-State configurations with DLor-JointTCIState or UL-TCIState, the UE may use a spatial domain transmit filter that is same as the spatial domain receive filter the UE may use to receive the DL reference signal associated with the indicated TCI state.

When the PDCCH reception includes two PDCCH from two respective search space sets, as described in clause 10.1 of REF 3 [6, TS 38.213], for the purpose of determining the time offset between the reception of the DL DCI and the corresponding PDSCH, the PDCCH candidate that ends later in time is used. When the PDCCH reception includes two PDCCH candidates from two respective search space sets, as described in clause 10.1 of REF 3 [6, TS 38.213], for the configuration of tci-PresentInDCI or tci-PresentDCI-1-2, the UE expects the same configuration in the first and second CORESETs associated with the two PDCCH candidates; and if the PDSCH is scheduled by a DCI format not having the TCI field present and if the scheduling offset is equal to or larger than timeDurationForQCL, if applicable, PDSCH QCL assumption is based on the CORESET with lower ID among the first and second CORESETs associated with the two PDCCH candidates.

For a periodic CSI-RS resource in an NZP-CSI-RS-ResourceSet configured with higher layer parameter trs-Info, the UE may expect that a TCI-State indicates one of the following quasi co-location type(s): 'typeC' with an SS/PBCH block and, when applicable, 'typeD' with the same SS/PBCH block, or 'typeC' with an SS/PBCH block and, when applicable, 'typeD' with a CSI-RS resource in an NZP-CSI-RS-ResourceSet configured with higher layer parameter repetition.

For periodic/semi-persistent CSI-RS, the UE can assume that the indicated DLorJointTCIState is not applied.

For an aperiodic CSI-RS resource in an NZP-CSI-RS-ResourceSet configured with higher layer parameter trs-Info, the UE may expect that a TCI-State indicates qcl-Type set to 'typeA' with a periodic CSI-RS resource in an NZP-CSI-RS-ResourceSet configured with higher layer parameter trs-Info and, when applicable, qcl-Type set to 'typeD' with the same periodic CSI-RS resource.

For a CSI-RS resource in an NZP-CSI-RS-ResourceSet configured without higher layer parameter trs-Info and without the higher layer parameter repetition, the UE may expect that a TCI-State indicates at least one of the following quasi co-location type(s):

'typeA' with a CSI-RS resource in a NZP-CSI-RS-ResourceSet configured with higher layer parameter trs-Info and, when applicable, 'typeD' with the same CSI-RS resource;

'typeA' with a CSI-RS resource in a NZP-CSI-RS-ResourceSet configured with higher layer parameter trs-Info and, when applicable, 'typeD' with an SS/PBCH block; or 'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition; or 'typeB' with a CSI-RS resource in a NZP-CSI-RS-ResourceSet configured with higher layer parameter trs-Info when 'typeD' is not applicable.

For a CSI-RS resource in an NZP-CSI-RS-ResourceSet configured with higher layer parameter repetition, the UE may expect that a TCI-State indicates at least one of the following quasi co-location type(s):

'typeA' with a CSI-RS resource in a NZP-CSI-RS-ResourceSet configured with higher layer parameter trs-Info and, when applicable, 'typeD' with the same CSI-RS resource;

'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition; or 'typeC' with an SS/PBCH block and, when applicable, 'typeD' with the same SS/PBCH block, the reference RS may additionally be an SS/PBCH block having a PCI different from the PCI of the serving cell. The UE can assume center frequency, SCS, SFN offset are the same for SS/PBCH block from the serving cell and SS/PBCH block having a PCI different from the serving cell.

For the DM-RS of PDCCH, the UE may expect that a TCI-State or DLorJointTCIState except an indicated DLorJointTCIState indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource;

'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition; or 'typeA' with a CSI-RS resource in a NZP-CSI-RS-ResourceSet configured without higher layer parameter trs-Info and without higher layer parameter repetition and, when applicable, 'typeD' with the same CSI-RS resource.

When a UE is configured with sfnSchemePdcch set to 'sfnSchemeA', and CORESET is activated with two TCI states, the UE may assume that the DM-RS port(s) of the PDCCH in the CORESET is quasi co-located with the DL-RSs of the two TCI states. When a UE is configured with sfnSchemePdcch set to 'sfnSchemeB', and a CORESET is activated with two TCI states, the UE may assume that the DM-RS port(s) of the PDCCH is quasi co-located with the DL-RS s of the two TCI states except for quasi co-location parameters {Doppler shift, Doppler spread} of the second indicated TCI state.

For the DM-RS of PDSCH, the UE may expect that a TCI-State or DLorJointTCIState except an indicated DLorJointTCIState indicates at least one of the following quasi co-location type(s):

'typeA' with a CSI-RS resource in a NZP-CSI-RS-ResourceSet configured with higher layer parameter trs-Info and, when applicable, 'typeD' with the same CSI-RS resource;

'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition; or typeA' with a CSI-RS resource in a NZP-CSI-RS-ResourceSet configured without higher layer parameter trs-Info and without higher layer parameter repetition and, when applicable, 'typeD' with the same CSI-RS resource.

For the DM-RS of PDCCH, the UE may expect that an indicated DLorJointTCIState indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource; or 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition.

For the DM-RS of PDSCH, the UE may expect that an indicated DLorJointTCIState indicates one of the following quasi co-location type(s) if the UE is configured [TCI-State](s) with [tci-StateId_r17]:

'typeA' with a CSI-RS resource in a NZP-CSI-RS-ResourceSet configured with higher layer parameter trs-Info and, when applicable, 'typeD' with the same CSI-RS resource; or 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition.

When a UE is configured with sfnSchemePdsch set to 'sfnSchemeA', and the UE is indicated with two TCI states in a codepoint of the DCI field 'Transmission Configuration Indication' in a DCI scheduling a PDSCH, the UE may assume that the DM-RS port(s) of the PDSCH is quasi co-located with the DL-RSs of the two TCI states. When a UE is configured with sfnSchemePdsch set to 'sfn-SchemeB', and the UE is indicated with two TCI states in a codepoint of the DCI field 'Transmission Configuration Indication' in a DCI scheduling a PDSCH, the UE may assume that the DM-RS port(s) of the PDSCH is quasi co-located with the DL-RSs of the two TCI states except for quasi co-location parameters {Doppler shift, Doppler spread} of the second indicated TCI state.

In Carrier Aggregation (CA), two or more Component Carriers (CCs), corresponding to two or more cells, are aggregated. A UE may simultaneously receive or transmit on one or multiple CCs/cells depending on its capabilities. A UE with single timing advance capability for CA can simultaneously receive and/or transmit on multiple CCs corresponding to multiple serving cells sharing the same timing advance (multiple serving cells grouped in one TAG). A UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell. A non-CA capable UE can receive on a single CC and transmit on a single CC corresponding to one serving cell only (one serving cell in one TAG).

CA is supported for both contiguous and non-contiguous CCs in frequency. When CA is deployed frame timing and SFN are aligned across cells that can be aggregated, or an offset in multiples of slots between the PCell/PSCell and an SCell is configured to the UE. The maximum number of configured CCs for a UE is 16 for DL and 16 for UL.

When CA is configured, the UE has one RRC connection with the network. At RRC connection establishment/re-establishment/handover, one serving cell provides the NAS mobility information, and at RRC connection re-establishment/handover, one serving cell provides the security input. This cell is referred to as the Primary Cell (PCell). Depending on UE capabilities, Secondary Cells (SCells) can be configured to form together with the PCell a set of serving cells. The configured set of serving cells for a UE therefore includes of one PCell and one or more SCells.

The reconfiguration, addition and removal of SCells can be performed by RRC. At intra-NR handover and during connection resume from RRC_INACTIVE, the network can also add, remove, keep, or reconfigure SCells for usage with the target PCell. When adding a new SCell, dedicated RRC signalling is used for sending all required system information of the SCell i.e., while in connected mode, UEs need not acquire broadcast system information directly from the SCells.

To enable reduced UE battery consumption when CA is configured, an activation/deactivation mechanism of Cells is supported. When an SCell is deactivated, the UE does not need to receive the corresponding PDCCH or PDSCH, cannot transmit in the corresponding uplink, nor is it required to perform CQI measurements. Conversely, when an SCell is active, the UE receives PDSCH and PDCCH (if the UE is configured to monitor PDCCH from this SCell) and is expected to be able to perform CQI measurements. NG-RAN ensures that while PUCCH SCell (a Secondary Cell configured with PUCCH) is deactivated, SCells of secondary PUCCH group (a group of SCells whose PUCCH signalling is associated with the PUCCH on the PUCCH SCell) should not be activated. NG-RAN ensures that SCells mapped to PUCCH SCell are deactivated before the PUCCH SCell is changed or removed.

When reconfiguring the set of serving cells, SCells added to the set are initially activated or deactivated and SCells which remain in the set (either unchanged or reconfigured) do not change their activation status (activated or deactivated).

At handover or when connection resumes from RRC_I-NACTIVE, SCells are activated or deactivated.

To enable reduced UE battery consumption when CA is configured and enable reduced UE complexity, one UL BWP for each uplink carrier and one DL BWP or one DL/UL BWP pair can be active at a time in an active serving cell, all other BWPs that the UE is configured with being deactivated. On deactivated BWPs, the UE does not monitor the PDCCH and does not transmit on PUCCH, PRACH and UL-SCH.

To enable fast SCell activation when CA is configured, one dormant BWP can be configured for an SCell. If the active BWP of the activated SCell is a dormant BWP, the UE stops monitoring PDCCH and transmitting SRS/PUSCH/PUCCH on the SCell but continues performing CSI measurements, AGC and beam management, if configured. A DCI is used to control entering/leaving the dormant BWP for one or more SCell(s) or one or more SCell group(s).

The dormant BWP is one of the UE's dedicated BWPs configured by network via dedicated RRC signalling. The SpCell and PUCCH SCell cannot be configured with a dormant BWP.

Cross-carrier scheduling using a carrier indicator field (CIF) allows a DCI format provided by a PDCCH on a serving/scheduling cell to schedule resources on another serving/scheduled cell with the following restrictions. When cross-carrier scheduling from an SCell to PCell is not configured to a UE, the UE can be scheduled transmission or reception on the PCell only by a DCI format provided by a PDCCH reception on the PCell. When cross-carrier scheduling from an SCell to PCell is configured to a UE: PDCCH on that SCell can provide a DCI format that schedules a PDSCH reception or a PUSCH transmission from the UE on the PCell; PDCCH on the PCell can provide a DCI format that schedules a PDSCH reception or a PUSCH transmission from the UE on the PCell; or Only one SCell can be configured to the UE for cross-carrier scheduling on the PCell. When an SCell is configured to a UE as a scheduling cell, a PDSCH reception or a PUSCH transmission from the UE is scheduled by a DCI format provided by a PDCCH reception on the SCell. When an SCell is not configured to a UE as a scheduling cell, a PDSCH reception or a PUSCH transmission from the UE is scheduled by a DCI format provided by a PDCCH reception on another serving cell. A PDCCH reception on a scheduling cell can have same or different numerology than an associated PDSCH reception or PUSCH transmission on a scheduled cell.

The Physical Downlink Control Channel (PDCCH) can be used to schedule DL transmissions on PDSCH and UL transmissions on PUSCH, where the Downlink Control Information (DCI) on PDCCH includes downlink assignments containing at least modulation and coding format, resource allocation, and hybrid-ARQ information related to DL-SCH and Uplink scheduling grants containing at least modulation and coding format, resource allocation, and hybrid-ARQ information related to UL-SCH.

In addition to scheduling, PDCCH can be used for: activation and deactivation of configured PUSCH transmission with configured grant; activation and deactivation of PDSCH semi-persistent transmission; notifying one or more UEs of the slot format; notifying one or more UEs of the PRB(s) and OFDM symbol(s) where the UE may assume no transmission is intended for the UE; transmission of TPC commands for PUCCH and PUSCH; transmission of one or more TPC commands for SRS transmissions by one or more UEs; switching a UE's active bandwidth part; initiating a random access procedure; indicating the UE(s) to monitor the PDCCH during the next occurrence of the DRX on-duration; in IAB context, indicating the availability for soft symbols of an IAB-DU.

A UE monitors a set of PDCCH candidates in the configured monitoring occasions in one or more configured COntrol REsource SETs (CORESETs) according to the corresponding search space sets configurations.

A CORESET comprises of a set of PRBs with a time duration of 1 to 3 OFDM symbols. The resource units Resource Element Groups (REGs) and Control Channel Elements (CCEs) are defined within a CORESET with each CCE including a set of REGs. Control channels are formed by aggregation of CCE. Different code rates for the control channels are realized by aggregating different number of CCE. Interleaved and non-interleaved CCE-to-REG mapping are supported in a CORESET.

Polar coding is used for a DCI format in a PDCCH. Each resource element group carrying PDCCH carries its own DM-RS. QPSK modulation is used for coded symbols of a DCI format in a PDCCH.

A UE monitors a set of PDCCH candidates in one or more CORESETs on the active DL BWP on each activated serving cell configured with PDCCH monitoring according to corresponding search space sets where monitoring implies receiving each PDCCH candidate and decoding the received information after demodulation according to the monitored DCI formats for the PDCCH candidate.

Throughout the present disclosure, embodiments are described in terms of multiple PDSCHs or multiple PUSCHs that are jointly scheduled on multiple serving cells, such as a subset/set of cells from among one or more sets of co-scheduled cells. The embodiments are generic and can apply to various other scenarios such as when a UE is jointly scheduled to receive/transmit multiple PDSCHs/PUSCHs: (a) from/to multiple transmission-reception points (TRPs) or other communication entities, such as multiple distributed units (DUs) or multiple remote radio heads (RRHs) and so on, for example, in a distributed MIMO operation, wherein TRPs/DUs/RRHs can be associated with one or more cells; (b) in multiple time units, such as multiple slots or multiple transmission time intervals (TTIs); (c) on one or more TRPs/cells, wherein the UE can receive/transmit more than one PDSCH/PUSCH on each co-scheduled TRP/cell; (d) for multiple transport blocks (TBs), or for multiple codewords (CWs) corresponding to single TB or multiple TBs; or (d) for multiple semi-persistently scheduled PDSCHs (SPS PDSCHs) or for multiple configured grant PUSCHs (CG PUSCHs) that are jointly activated on one or multiple TRPs/cells.

Accordingly, any reference to "co-scheduled cells" can be replaced with/by "co-scheduled TRPs/DUs/RRHs" or "co-scheduled slots/TTIs", or "co-scheduled PDSCHs/PUSCHs", or "co-scheduled TBs/CWs", or "co-scheduled SPS-PDSCHs/CG-PUSCHs", and so on. Similarly other related terms may be replaced by like terms, such as "multi-cell scheduling", and so on.

Various embodiments consider reception of multiple PDSCHs or transmission of multiple PUSCHs on respective cells, including carriers of a same cell such as on an UL carrier (also referred to as, a normal UL (NUL) carrier) or a supplemental UL (SUL) carrier. The embodiments also apply to cases where scheduling is for a mixture of PDSCHs and PUSCHs. For example, the UE can receive first PDSCHs on respective first cells and can transmit second PUSCHs on respective second cells, wherein the first PDSCHs and the second PUSCHs are jointly scheduled.

Various embodiments of the present disclosure provide multi-cell scheduling operations. A UE can be provided a number of sets of co-scheduled cells by higher layers. The term 'set of co-scheduled cells' is used to refer to a set of serving cells wherein the UE can be scheduled PDSCH receptions or PUSCH transmissions on two or more cells from the set of co-scheduled cells jointly by a single DCI format, or by using complementary methods such as those described in more embodiments below. For convenience of presentation, such DCI format may be referred to as a multi-cell scheduling DCI (MC-DCI) format. The MC-DCI format can be a new DCI format, such as DCI format 0_3 for co-scheduled PUSCHs or 1_3 for co-scheduled PDSCHs. Additionally, the UE can be indicated via a DCI format, such as the MC-DCI format, in a PDCCH or via a MAC CE in a PDSCH a subset of a set of co-scheduled cells, wherein cells of the subset can change across different PDCCH monitoring occasions (MOs). For example, a first MC-DCI format in a first MO can indicate a first set/subset of co-scheduled cells, and a second DCI format in a second MO can indicate a second set/subset of co-scheduled cells.

In one example, multi-cell scheduling can also include operations related to DL/UL transmissions such as reporting HARQ-ACK information, beam/CSI measurement or reporting, transmission or reception of UL/DL reference signals, and so on.

In one example, the UE can be configured by higher layers, such as by a UE-specific RRC configuration, a number of sets of co-scheduled cells. For example, the UE can be configured a first set of cells, such as {cell #0, cell #1, cell #4, cell #7} and a second set of cells such as {cell #2, cell #3, cell #5, cell #6}. The multiple sets of co-scheduled cells can be scheduled from a same scheduling cell or from different scheduling cells.

In one example, a set of co-scheduled cells can include a primary cell (PCell/PSCell) and one or more SCells. In another example, a set of co-scheduled cells can include only SCells. In one example, a scheduling cell can belong to a set of co-scheduled cells. In another example, the scheduling cell may not belong to a set of co-scheduled cells. In a further example, the UE does not expect that a scheduling cell belongs to a set of co-scheduled cells.

In one example, per specifications of the system operation, a set of co-scheduled cells is defined as a set that includes all scheduled cells having a same scheduling cell, and additional higher layer configuration is not required for indication of the set of co-scheduled cells. Accordingly, a DCI format for multi-cell scheduling, or other complementary methods, can jointly schedule any number of scheduled cells that have a same scheduling cell. For example, a MC-DCI format can include a bitmap to indicate which of the scheduled cells are jointly scheduled.

In another example, a set of co-scheduled cells can have two or more scheduling cells. For example, a UE can receive a first MC-DCI format in a first PDCCH monitoring occasion on a first scheduling cell for scheduling a set of co-scheduled cells, and can receive a second MC-DCI format in a second PDCCH monitoring occasion on a second scheduling cell for scheduling a set of co-scheduled cells. The DCI format can be associated with any search space set type (CSS or USS) or can be restricted to be associated only with USS sets. For example, the DCI format can be associated with multicast scheduling and have CRC scrambled by a G-RNTI and PDCCH candidates monitored according to CSS sets, or can be associated with unicast scheduling and have CRC scrambled by a C-RNTI and PDCCH candidates monitored according to USS sets. Such PDCCH monitoring from two scheduling cells can be simultaneous, for example in a same span of symbol or in a same slot, or can be non-overlapping, such as in different slots (per higher layer configuration, or per indication in a PDCCH or via a MAC CE). The UE may or may not expect that both the first scheduling cell and the second scheduling cell can schedule, through DCI formats in PDCCH receptions in a same time interval such as a span or a slot, PUSCH transmissions or PDSCH receptions on a same cell. For example, for a given scheduled cell, the UE can be configured to monitor PDCCH providing MC-DCI corresponding to a set of co-scheduled cells that include the given scheduled cell only on the first scheduling cell, or only on the second scheduling cell, or on both the first and second scheduling cells. The UE can also monitor PDCCH for detection of a DCI format providing scheduling only on one cell from the set of co-scheduled cells (single-cell scheduling DCI format). For example, the UE can be configured to monitor PDCCH on a first scheduling cell for single-cell scheduling on a serving cell, and monitor PDCCH on a second scheduling cell for multi-cell scheduling on a set of co-scheduled cells that include the serving cell.

A UE can report one or more of a maximum number of sets of co-scheduled cells, or a maximum number of cells within a set of co-scheduled cells, or a maximum total number of co-scheduled cells across different sets, or a maximum number of co-scheduled cells per PDCCH monitoring occasion, as capability to the gNB. In one example, that capability can depend on an operating frequency band or on a frequency range such as above or below 6 GHz.

Multi-cell scheduling can be an optional UE feature with capability signaling that can additionally be separate for PDSCH receptions and for PUSCH transmissions. For example, a UE can report a capability for a maximum number of {2, 4, 8, 16} co-scheduled cells for the DL and a maximum of {2, 4} co-scheduled cells for the UL. The UE can be configured a number of sets/subsets of co-scheduled cells such that the sizes of the sets/subsets do not exceed the corresponding values reported by the UE capability. For example, the UE can be configured separate sets of co-scheduled cells for PDSCH receptions compared to sets of co-scheduled cells for PUSCH transmissions.

A UE can also be configured a number of cells that do not belong to any of the sets of co-scheduled cells. For example, the UE can be configured a cell #8 that does not belong to either the first set or the second set of co-scheduled cells in the previous example.

In one example, restrictions can apply for co-scheduled cells and a UE can expect that co-scheduled cells in a corresponding set: have a same numerology (SCS configuration and CP); have a same numerology for respective active DL/UL BWPs; have a same duplex configuration, for example, all cells have FDD configuration or all cells have TDD configuration and, in case of a TDD configuration, also have a same UL-DL configuration; are within a same frequency band (intra-band CA) or within a same frequency range (such as FR1 or FR2 or FR2-1 or FR2-2); or have a same licensing type, for example, all cells are licensed or all cells are unlicensed.

In one example, the above restrictions may not apply to a scheduling cell if the scheduling cell belongs to a set of co-scheduled cells. For example, a scheduling cell can have a different SCS configuration than (other) cells in a set of co-scheduled cells. For example, a scheduling cell can be in FR1 and an FDD band, and jointly schedule a set of co-scheduled cells in FR2 and in TDD bands.

A serving cell can belong only to a single set of co-scheduled cells so that the sets of co-scheduled cells do not include any common cell, or can belong to multiple sets of co-scheduled cells to enable larger scheduling flexibility to a serving gNB. For example, a serving cell can belong to a first set of co-scheduled cells and to a second set of co-scheduled cells, for example when cells in the first and second sets of co-scheduled cells have a common feature such as a common numerology, duplex configuration, operating frequency band/range, and so on. Also, a serving cell can belong to both a first set of co-scheduled cells and to a second set of co-scheduled cells, when the serving cell has a first common feature with cells in the first set of co-scheduled cells and a second common feature with cells in the second set of co-scheduled cells, wherein the first common feature can be different from the second common feature. When a first cell using paired spectrum operation (FDD) and a second cell using unpaired spectrum operation (TDD) are in a same set of co-scheduled cells and a DCI format schedules a first PDSCH reception on the first cell and a second PDSCH reception on the second cell and the second PDSCH reception includes symbols that are UL symbols on the second cell, for example as determined based on an UL-DL configuration provided by a SIB or by UE-specific RRC signaling, the UE does not receive the second PDSCH over the UL symbols or does not receive the second PDSCH over any symbols on the second cell. Alternatively, the UE can apply rate matching for the second PDSCH around the UL symbols on the second cell, so that the UE receives the second PDSCH with an adjusted rate in other remaining symbols. Similar UE behaviors can apply when the first and second scheduled cells use unpaired spectrum operation with different UL-DL configurations, such as on different frequency bands.

In a first approach, a UE expects to be provided multi-cell scheduling for all cells in a set of co-scheduled cells. For example, for a first set of co-scheduled cells including cells {cell #0, cell #1, cell #4, cell #7}, a DCI format schedules PDSCH receptions or PUSCH transmissions on all four cells in the first set of co-scheduled cells {cell #0, cell #1, cell #4, cell #7}. When a UE is configured a first set and a second set of co-scheduled cells, in one example, the UE expects that there are no serving/scheduled cells configured in both the first and the second sets (that is, no overlap between the first and second sets). In another example, the first and second sets can have common element(s), that is, both the first set and the second set can include a first serving/scheduled cell. For example, the latter can apply when both the first and the second sets correspond to a same scheduling cell. For example, the first cell can be the scheduling cell. In one example, the MC-DCI format needs to indicate a set of co-scheduled cells, from the multiple sets of co-scheduled cells. For example, a first MC-DCI can indicate a first set of co-scheduled cells to jointly schedule all cells in the first set of co-scheduled cells, and a second MC-DCI can indicate a second set of co-scheduled cells to jointly schedule all cells in the second set of co-scheduled cells.

In a second approach, the UE can be provided multi-cell scheduling for a subset of a set of co-scheduled cells. For example, a DCI format can schedule PDSCH receptions or PUSCH transmissions on only two cells, such as {cell #0, cell #4}, from the first set of cells.

In a first option for the second approach, the subset of cells can be indicated by a MAC CE. Such a MAC CE command can include one or more of an indication for activation or deactivation/release of a subset of cells, an indication for a number of sets of co-scheduled cells, or an indication for a number of subsets of co-scheduled cells from a corresponding number of sets of co-scheduled cells.

For example, a MAC CE activates a first subset of a set of co-scheduled cells and subsequent DCI formats for multi-cell scheduling apply to the first subset of cells activated by the MAC CE. The UE can receive another MAC CE command that deactivates the first subset of co-scheduled cells, or activates a second subset of co-scheduled cells, wherein the second subset can be a subset of the same set of co-scheduled cells or a subset of a different set of co-scheduled cells. If a UE receives a MAC CE that deactivates the first subset of co-scheduled cells, but does not activate a second subset of co-scheduled cells, in one alternative, the UE does not expect to receive a DCI format for multi-cell scheduling, and the UE may not monitor PDCCH according to respective search space sets, until the UE receives a new MAC CE that activates a second subset of co-scheduled cells. In another alternative, the UE can receive DCI formats for multi-cell scheduling even before receiving a new MAC CE that activates a second subset of co-scheduled cells, but the UE expects to be provided an indication for a subset of co-scheduled cells by the DCI formats, or by using complementary methods, such as those described in embodiment E-0-1, for multi-cell scheduling.

In a second option for the second approach, the subset of the set of co-scheduled cells can be provided by a DCI format in a PDCCH/PDSCH. The subset of cells can change between PDCCH monitoring occasions (MOs) for PDSCH/PUSCH scheduling as indicated by a corresponding DCI format. For example, a first MC-DCI format in a first PDCCH MO indicates PDSCH or PUSCH scheduling on a first subset of cells, while a second MC-DCI format in a second PDCCH MO indicates PDSCH or PUSCH scheduling on a second subset of cells.

In a first example, a DCI format for multi-cell scheduling provides an index for a subset of cells that are co-scheduled such as a CIF value that corresponds to a subset of one or more cells from a set of co-scheduled cells. For example, UE-specific RRC signaling can indicate first/second/third/fourth indexes and corresponding first/second/third/fourth subsets that include one or more cells from a set of co-scheduled cells, wherein a subset can also include all cells from the set of co-scheduled cells. Then, a CIF field of 2 bits in a DCI format can provide a value that indicates the subset of scheduled cells. Such CIF refers, in general, to sets of co-scheduled cells, rather than individual scheduled cells, so can be referred to as "set-level" CIF (compared to "cell-level" CIF for the latter). The UE can be provided separate configuration for a first number of sets/subsets of co-scheduled cells for PDSCH reception, compared to a second number of sets/subsets of co-scheduled cells for PUSCH transmission. Therefore, the UE can be provided a first set of indexes for set-level CIFs for PDSCH receptions that are different from a second set of indexes for set-level CIFs for PUSCH transmissions. For example, the UE can be provided 4 bits for "set-level" CIF for PDSCH receptions, and 3 bits for "set-level" CIF for PUSCH transmissions. The set-level CIF can be also referred to as cell-set indicator function value or carrier-set indicator function value.

In one example, when using a two-stage method for joint scheduling of a set/subset of co-scheduled cells, as described in embodiments below, when the $1^{st}$ stage DCI is on a first PDCCH on a first cell, and the $2^{nd}$ stage DCI is on a first PDSCH on a second cell, and the first PDSCH schedules second PDSCHs/PUSCHs, in one option, the UE considers the scheduling cell for the second PDSCHs/PUSCHs to be the first cell, and corresponding CIF associations are defined with respect to the first cell and configuration thereof. In another option, the UE considers the scheduling cell for the second PDSCHs/PUSCHs to be the second cell, and corresponding CIF associations are defined with respect to the second cell and configuration thereof.

In yet another example, a DCI format can include a 1-bit flag field to indicate whether the DCI format is for single-cell scheduling or for multi-cell scheduling in order for a UE to accordingly interpret fields of the DCI format that may also include the CIF field. Then, for single-cell scheduling, the CIF field can be interpreted as in case of single-cell cross-carrier scheduling while for multi-cell scheduling the CIF field can be interpreted as indicating a subset from the set of co-scheduled cells. In one example, instead of an explicit 1-bit flag to indicate single-cell scheduling or multi-cell scheduling, the UE can be configured a number of sets/subsets of co-scheduled cells, some of which include only one scheduled cell and others include more than one scheduled cell. Therefore, the CIF values for single-cell scheduling can be separate from CIF values for multi-cell scheduling. For example, CIF values 0, 1, 2, 3 correspond to scheduling individual cells, and CIF values 4, 5, 6, 7 correspond to sets/subsets of co-scheduled cells and the functionality of the 1-bit flag can be absorbed in the CIF. Therefore, the UE can determine whether the DCI format is for single-cell scheduling or for multi-cell scheduling based on the CIF value.

In another example, a DCI format for multi-cell scheduling provides a number of co-scheduled cells, and the indexes of the co-scheduled cells are provided by additional methods, such as by an additional DCI format or by higher layer signaling as described in embodiments below.

In another example, a CIF field in a DCI format for multi-cell scheduling can be a bitmap mapping to the individual cells or subsets of cells from the set of co-scheduled cells. For example, when the UE is configured a maximum number of N scheduled cells, such as N=8 cells, associated with a scheduling cell, the UE can be configured a bitmap with N bits, wherein a value '1' for a bit in the bitmap indicates scheduling on the corresponding cell, and a value '0' for the bit in the bitmap indicates no scheduling on the corresponding cell. For example, the bitmap can be in ascending or descending order of cell indexes or (cell-level) CIF values or cell indexes for the scheduled cells. For example, the left-most bit (respectively, the right-most bit) can correspond to a scheduled cell with the smallest cell index or cell-level CIF, and the second left-most bit (respectively, the second right-most bit) can correspond to a scheduled cell with the second smallest cell index or cell-level CIF, and so on. For example, if the UE is configured a number (M) of scheduled cells, such as M=4 cells, that is less than a maximum supported number of N scheduled cells, such as N=8 cells, in one option, the bitmap can include 8 bits, and the remaining rightmost (respectively, the remaining leftmost) M−N bits, such as 8−4=4 bits, can be all zeros or all ones. In another option, the bitmap can include only M=4 bits.

In other options for the second approach, a UE can implicitly determine indexes for co-scheduled cells without need for explicit gNB indication. For example, the UE can determine indexes for co-scheduled cells based on a PDCCH monitoring parameter, such as: a CORESET index; a search space set index, or a carrier indicator parameter n CI corresponding to the search space set index; or a set of CCEs in the search space set or a first/last CCE in the search space set; where the UE received a PDCCH providing the DCI format for multi-cell scheduling.

The UE can be configured a mapping among values for PDCCH monitoring parameters, such as search space sets, and a number of co-scheduled cells or indexes of the co-scheduled cells. In one example, first and second values for parameter n_CI in a search space set can respectively indicate first and second subsets of co-scheduled cells. According to this example, the parameter n_CI can correspond to a single cell or can correspond to a group of cells, such as a subset/set of co-scheduled cells.

In another option, the UE can determine a set of co-scheduled cells implicitly based on other fields in an MC-DCI format, without need for an explicit CIF field. For example, when the UE is provided a joint TDRA table for multi-cell scheduling, an index of the joint TDRA table can indicate a set/subset of co-scheduled cells. For example, an entry/row in the joint TDRA table configured by the RRC includes a first TDRA information for a first cell and a second TDRA information for a second cell, and so on, while the entry may include no information for a third cell. Therefore, when the MC-DCI format includes an indication of the entry/row of the joint TDRA table implies that the first and second cells are jointly scheduled by the MC-DCI format, while the third cells is not scheduled. In one example, other DCI fields with joint indication can be used other than TDRA, such as the FDRA field.

In another example, the UE expects that the MC-DCI includes a number N TDRA fields corresponding to a maximum number N of supported/configured scheduled cells for a scheduling cell, wherein a certain value such as all zeros or all ones for the TDRA fields is reserved to indicate no scheduling on the corresponding cell. Therefore, when the MC-DCI receives an MC-DCI format that includes M TDRA fields (out of the N TDRA fields) with the reserved value, the UE determines that the MC-DCI does not schedule the corresponding M cell and jointly schedules only the N– M cells. In one example, other DCI fields with separate indication can be used other than TDRA, such as the FDRA field.

In another example, when a HARQ process number (HPN) field or a redundancy version field, or a new data indicator field are separately provided for each scheduled cell in an MC-DCI format and a combination of those fields, such as all of those fields, have same values for a subset of co-scheduled cells, such as HPN 15 (counting from 0 to 15 for a HPN field of 4 bits), RV 1, and NDI 1, the subset of co-scheduled cells can be assumed as not being scheduled by the MC-DCI format.

In another example, when a MCS field is separately provided for each scheduled cell in an MC-DCI format and the MCS field has a predetermined value, such as 0, for a subset of co-scheduled cells, the subset of co-scheduled cells can be assumed as not being scheduled by the MC-DCI format.

Receptions or transmissions on a respective subset of cells that are jointly scheduled by a single DCI format, or by using complementary methods such as those described in embodiments below, can refer to PDSCHs or PUSCHs that may or may not overlap in time. For example, the UE can be indicated to receive PDSCHs or to transmit PUSCHs on respective co-scheduled cells wherein all receptions/transmissions are in a same slot or at least one reception/transmission is in a different slot than the remaining ones.

A UE that is configured for multi-cell scheduling can be provided a first set of cell-common parameters whose values apply for scheduling on all co-scheduled cells, and a second set of cell-specific parameters whose values apply for scheduling on each corresponding co-scheduled cell. The UE can determine cell-common and cell-specific scheduling information parameters based on the specifications of the system operation, or based on higher layer configuration. For some cell-specific scheduling information parameters, the UE can be provided differential values compared to a reference value wherein the reference value can correspond, for example, to a first scheduled cell from a set of scheduled cells. For example, the reference value can correspond to the scheduled cell with the smallest cell index or smallest (cell-level) CIF value.

For a UE that is configured a number of sets of co-scheduled cells, a DCI format for multi-cell scheduling can provide complete or partial information for cell-common or cell-specific scheduling parameters, for multiple PDSCH receptions or multiple PUSCH transmissions on respective multiple co-scheduled cells. When the DCI format for multi-cell scheduling provides partial information for a scheduling parameter, the UE can determine remaining information from UE-specific RRC signaling or by other complementary methods.

Various embodiments of the present disclosure provide Mechanisms for multi-cell scheduling. For a UE that is configured a set of co-scheduled cells, a DCI format for multi-cell scheduling can provide full or partial information for values of cell-common and cell-specific fields for scheduling PDSCH receptions or PUSCH transmissions on respective two or more cells from the set of co-scheduled cells. When the DCI format provides partial information, the UE can determine remaining information from RRC signaling or by using other complementary methods.

In a first approach, referred to as concatenated DCI format for multi-cell scheduling, a single DCI format can include information of all scheduling parameters for all the co-scheduled PDSCH receptions or PUSCH transmissions, except possibly for some information that is provided by higher layers or predetermined by the specifications for system operations or implicitly determined by the UE. For example, the MC-DCI format can provide separate values of fields for PDSCH reception or PUSCH transmission on each of the multiple co-scheduled cells. A first value corresponds to a first cell, a second value corresponds to a second cell, and so on. Therefore, DCI format fields for the multiple cells are concatenated, thereby referring to such DCI format as a concatenated DCI format for multi-cell scheduling. This approach can be beneficial, for example, for co-scheduling cells that have different channel characteristics or configurations, such as for inter-band CA operation, or for co-scheduling a PDSCH reception and a PUSCH transmission. Some DCI fields can be cell-common and provided only once in a concatenated DCI format. In one example, a functionality of a field in a first DCI format scheduling PDSCH reception or PUSCH transmission on a single cell and provides information for multiple cells, such as a SCell dormancy indicator field as described in REF 3 TS 38.213 v17.1.0, can remain same in a second DCI format scheduling PDSCH receptions or PUSCH transmissions on multiple cells and the field can remain as in the first DCI format. Alternatively, such fields can be omitted from the second DCI format.

In a second approach, referred to as multi-cell scheduling via multi-cell mapping, a UE can be provided information for multi-cell scheduling of multiple PDSCHs/PDCCHs on multiple respective cells using a multi-cell mapping, wherein a field in a DCI format can be interpreted to provide multiple values for a corresponding scheduling parameter for the multiple co-scheduled cells. Such interpretation can be based on a configured one-to-many mapping/table or based on multiple configured offset values for respective cells that are applied to a reference value indicated by the DCI format. For example, the field can be an MCS field wherein a value indicated in the DCI format can be for a PDSCH reception on a first cell and a value for a PDSCH reception on a second cell can be determined from the first value and a configured offset value. It is also possible that a same MCS value applies for all PDSCH receptions or PUSCH transmissions. This approach can be beneficial, for example, for co-scheduling cells that have several similar physical channel characteristics or configurations, such as for intra-band CA operation.

In a third approach, referred to as single-cell DCI pointing to a PDSCH with multi-cell scheduling, a UE can be provided information for multi-cell scheduling using a single-cell scheduling DCI format, namely a DCI format that schedules a first PDSCH on a first cell, wherein the first PDSCH includes scheduling information for reception of second PDSCH(s) or transmission of second PUSCH(s) on a subset from one or more sets of co-scheduled cells. This approach can be beneficial, for example, for co-scheduling several (such as 4-8) cells that have different channel characteristics or configurations, such as for inter-band CA operation.

In a first option for the third approach, the first PDSCH includes a MAC CE that provides scheduling information for the number of PDSCH(s) or PUSCH(s). Accordingly, the MAC CE can include a number of modified DCIs (M-DCIs), wherein each M-DCI includes full or partial scheduling information for a PDSCH/PUSCH from the number of PDSCH(s)/PUSCH(s).

In a second option for the third approach, multi-cell scheduling information is multiplexed as M-DCI in a PDSCH. The UE receives a first PDSCH that is scheduled by a single-cell scheduling DCI format, and the UE receives additional scheduling information for one or more PDSCH(s)/PUSCH(s) on one or more respective co-scheduled cell(s). The UE allocates the coded modulation symbols for M-DCIs to time/frequency resources within the first PDSCH, for example in a frequency-first, time-second manner, except for reserved resources corresponding to reference signals or other cell-level broadcast transmissions. The UE can start receiving the M-DCIs in a first symbol of the first PDSCH, or in a first symbol after first symbols with DM-RS REs, in the first PDSCH. The M-DCIs can be jointly coded and include a single CRC.

In a fourth approach, referred to as multi-stage PDCCHs/ DCIs for multi-cell scheduling, a UE can be provided information for multi-cell scheduling of multiple PDSCHs/ PUSCHs on multiple respective cells using a multi-stage DCI method, such as a 2-stage DCI wherein, for example, a first-stage DCI format includes a set of cell-common fields, and a second-stage DCI format includes cell-specific fields. The UE receives the first-stage DCI format in a first PDCCH and the second-stage DCI format in a second PDCCH. The first PDCCH and the second PDCCH are linked. In one example, the first and the second PDCCHs are in a same search space set. This approach can be beneficial, for example, for co-scheduling several cells that have several common physical characteristics, such as a time-domain resource allocation or a frequency-domain resource allocation using the first-stage DCI format and without incurring latency or having a DCI format size that is too large (that would result if the first-stage and second-stage DCI formats were combined into a single DCI format) for receiving cell-specific parameters when the second PDCCH is received in a same slot as the first PDCCH. The first-stage DCI format can also indicate a time/frequency resource for a PDCCH providing the second-stage DCI format, such as an index of a PDCCH candidate for a corresponding CCE aggregation level, so that the UE can interpret the contents of the second-stage DCI format or reduce a number of PDCCH receptions. A UE can determine an association among a number of linked multi-stage PDCCHs/DCIs, such as two PDCCHs/DCIs, that provide multi-cell scheduling information based on parameters of the linked DCI formats, such as size(s) of the DCI format(s), or RNTI(s) associated with the DCI format(s), or by an explicit indication in some field(s) in the DCI format(s), or based on PDCCH monitoring parameters, such as CORESET, search space, CCEs, or monitoring occasions in which the UE receives the first and the second linked PDCCHs.

Various embodiments of the present disclosure provide TCI field absent in multi-cell scheduling DCI (MC-DCI) format. In another embodiment, an MC-DCI format does not include a field for indication of TCI state. Accordingly, the UE determines a TCI state for the co-scheduled cells by an MC-DCI format based on most recent TCI states indicated individually for each cell from the set of co-scheduled cells by single-cell scheduling DCI (SC-DCI) formats. The UE may require, based on UE capability, a minimum processing time or application time among the MC-DCI format and the most recent SC-DCI formats providing the TCI states.

For example, the UE receives indication of a first TCI state for a first cell using a first SC-DCI format and receive indication of a second TCI state for a second cell using a second SC-DCI format. When a UE receives an MC-DCI format after the first and second SC-DCI formats, and the MC-DCI format jointly schedules PDSCHs or PUSCHs on the first and second cells, the MC-DCI format may not include a TCI state field, and the UE applies the first and second TCI states for the first and second cells, respectively. Herein, it is assumed that the first and second DCI formats are the most recent SC-DCI formats before reception of the MC-DCI format.

In one example, for determination of the most recent SC-DCI formats providing indication of TCI states for co-scheduled cells by an MC-DCI format, the UE determines the most recent DCI formats as SC-DCI formats before the MC-DCI format that the UE receives (in a first option) no later than N symbols before the first/last symbol of a PDCCH that includes the MC-DCI format, or (in a second option) no later than N symbols before the first/last symbol of a first/earliest (or last/latest) PDSCH from the corresponding co-scheduled PDSCHs or a first/earliest (or last/latest) PUSCH from the corresponding co-scheduled PUSCHs, or no later than N symbols before the first/last symbol of an M-th PDSCH or PUSCH from the corresponding co-scheduled PDSCHs or PUSCHs for an M-th cell when the most recent SC-DCI corresponds to the M-th cell. For example, a UE is not expected to apply, for a cell from a set of co-scheduled cells indicated by an MC-DCI format, a TCI state indicated by an SC-DCI format that the UE received before the MC-DCI format if the UE receives the SC-DCI format in a second PDCCH that starts/ends in a symbol that is (in the first option) later than N symbols (that is, less than N symbols) before the first (or last) symbol of a first PDCCH that includes the MC-DCI format, or (in the second option) later than N symbols (that is, less than N symbols) before the first (or last) symbol of a first (or last) PDSCH from the corresponding co-scheduled PDSCHs or a first (or last) PUSCH from the corresponding co-scheduled PUSCHs. Herein, a first/earliest (or last/latest) PDSCH or PUSCH can be based on a starting symbol (or ending) symbol of the PDSCH or PUSCH with respect to an SCS as subsequently described. In one example, N symbols is considered after a (first or) last symbol of the PDCCH that includes the SC-DCI format. In another example, N symbols is considered after a (first or) last symbol of a PUCCH or a PUSCH that the UE would transmit, wherein the PUCCH or the PUSCH would include HARQ-ACK information corresponding to the SC-DCI format (or corresponding to a PDSCH that that is scheduled by the SC-DCI format). For example, above options can be modified such that N symbols is replaced with the start of the first slot that is after the N symbols. For example, the UE determines the most recent SC-DCI format corresponding to a first cell before an MC-DCI format as a first SC-DCI format that indicates a first TCI state applicable to the first cell with or without scheduling a second PDSCH on the first cell, such that a first/last symbol of a PDCCH that includes the MC-DCI format, or a first PDSCH/PUSCH corresponding to the first cell from among the PDSCHs/PUSCHs that are co-scheduled by the MC-DCI format is in a slot that is same as or after a first slot that is N symbols after a slot or after a first/last symbol of a slot or after a first/last symbol of a PUCCH or a PUSCH that would provide a HARQ-ACK feedback corresponding to the first SC-DCI format (or corresponding to a second PDSCH that is scheduled by the first SC-DCI format).

Herein, N symbols (or first slot after the N symbols) is based on a UE capability for a minimum processing time or application time, such as a PDSCH processing time, or a PUSCH processing time, or a time duration for QCL application, or a beam application time such as BeamApp-Time_r17, as considered in [TS 38.214 v17.2.0]. In another example, N symbols is based on a UE capability for a PDCCH processing time, such as a minimum number of symbols required before transmission of a HARQ-ACK corresponding to a DCI format 1_1 or 0_1 or 1_2 or 0_2 that is re-purposed for TCI state indication or for SCell dormancy indication or used for release/deactivation of an SPS PDSCH, and so on, as considered in REF 4 [TS 38.214, v17.2.0] or REF 3 [TS 38.213, v17.2.0]. Herein, a symbol can be with respect to:

■ an SCS of (an active BWP of) a scheduled cell for which the UE receives the SC-DCI format;
■ an SCS of (an active BWP of) a scheduling cell for the MC-DCI format or the SC-DCI format;
■ a common SCS configured for (active BWPs of) the set of co-scheduled cells, if applicable;
■ a smallest (or largest) SCS configuration (for active BWPs) among the set of co-scheduled ells;
■ an SCS configuration (such as an SCS of an active BWP or a smallest or largest SCS configured) for a cell with smallest cell index (or with largest cell index) among the set of co-scheduled cells;
■ an SCS configuration (such as an SCS of an active BWP or a smallest or largest SCS configured) for a cell with smallest cell-level CIF (or with largest cell-level CIF) among the set of co-scheduled cells; or
■ an SCS configuration of an active BWP with the smallest SCS among the (configured/active) BWP(s) from the CCs/cells applying the indicated DL/UL/joint TCI state that are active at the end of the PUCCH or the PUSCH carrying the positive HARQ-ACK information corresponding to the indicated TCI state (such as the DCI format indicating the TCI state, or a corresponding PDSCH that is scheduled by the DCI format that indicates the TCI state); or ■ a reference SCS configured by the gNB or predetermined in the specifications for system operation, such as 15 kHz for one or both of FR1 and FR2, or such as SCS=30 kHz for FR1, and SCS=120 kHz for FR2-1, and so on.

Similar methods and examples are described above for determination of TCI states for co-scheduled PDSCHs or PUSCHs from most recent SC-DCI formats can apply when the UE determine TCI states for co-scheduled PDSCHs or PUSCHs from most recent MC-DCI formats that provide TCI state indication as described in embodiments below (or combination of most recent SC-DCI formats and MC-DCI formats, whichever are most recent).

FIG. 6 illustrates a flow chart of a method 600 for TCI state determination for co-scheduled PDSCHs or PUSCHs in accordance with various embodiments of the present disclosure. For example, the method 600 may be performed by the UE 116. FIG. 6 is for illustration and not intended as a limitation on the types of methods that can be utilized in embodiments of the present disclosure.

With reference to FIG. 6, a UE is configured a set of co-scheduled cells that includes first cells and second cells, 610. The UE receives a first SC-DCI (or MC-DCI) format indicating a first TCI state for the first cells, 620. The UE receives a second SC-DCI (or MC-DCI) format indicating a second TCI state for the second cells, 630. The UE receives a third MC-DCI format, after the first and second SC-DCI (or MC-DCI) formats, that schedules PDSCHs or PUSCHs on the set of co-scheduled cells, 640. The first and second SC-DCI (or MC-DCI) formats are the most recent DCI formats, prior to the third MC-DCI format, that indicate TCI states for the first and second cells, considering processing or beam application time. The UE receives first PDSCHs or transmits first PUSCHs, from the PDSCHs or PUSCHs, on the first cells using the first indicated TCI state, and receives second PDSCHs or transmits second PUSCHs, from the PDSCHs or PUSCHS, on the second cells using the second indicated TCI state, 650.

Various embodiments of the present disclosure provide TCI field present in multi-cell scheduling DCI (MC-DCI) format. In more embodiments, an MC-DCI format can include one or multiple values for a TCI state field, wherein each value corresponds to a cell or a group of cells from the set of co-scheduled cells by the MC-DCI format. In one aspect, the value(s) for the TCI state field correspond to TCI states configured/activated for a number of lists of cells configured for simultaneous TCI state update, and the number of values for the TCI state field in the MC-DCI state is based on the number of lists of cells for simultaneous TCI state update. In another aspect, the MC-DCI format can include a value for the TCI state field, wherein the value is from a set of configured/activated reference TCI states on a reference cell. In a further aspect, the multiple TCI state indications corresponding to different cells or groups of cells from the set of co-scheduled cells can be provided using multiple separate values in the MC-DCI format, or using a single value based on a joint multi-cell TCI state mapping or table. In one example, when the MC-DCI format includes multiple TCI state indications, the MC-DCI format can include a single TCI state field with multiple values, or can include multiple TCI state fields each with a separate value corresponding to one of the indicated TCI states.

In another aspect, when a set of co-scheduled cells, that is indicated by an MC-DCI format, coincides with (or is a subset of) a single list of cells for simultaneous TCI state update, the MC-DCI format includes a single value for the TCI state field, and the UE applies the indicated TCI state to all co-scheduled cells. For example, when the UE is configured List #1={cell #1, cell #2, cell #3, cell #4} for simultaneous TCI state, and the UE receives a first MC-DCI format that jointly schedules Set #1={cell #1, cell #2, cell #3, cell #4}, the first MC-DCI state can include a single value for the TCI state, and the indicated TCI states applies to all co-scheduled cells in the Set #1. Also, when the UE receives a second MC-DCI format that jointly schedules Set #2={cell #2, cell #3}, since Set #2 is a subset of List #1, the second MC-DCI state can include a single value for the TCI state, and the indicated TCI states applies to all co-scheduled cells in the Set #2.

In more aspects, when a set of co-scheduled cells, that is indicated by an MC-DCI format, includes (or overlaps with) M different list of cells for simultaneous TCI state update, the MC-DCI format includes M values for the TCI state field, and the UE applies the M indicated TCI states to corresponding co-scheduled cells from the M different lists. For example, the UE applies a first TCI state from the M indicated TCI states by the MC-DCI format to first cells from the set of co-scheduled cells that are included in a first list of cells for simultaneous TCI state update, and the UE applies a second TCI state from the M indicated TCI states by the MC-DCI format to second cells from the set of co-scheduled cells that are included in a second list of cells for simultaneous TCI state update, and so on. The MC-DCI format includes the M values for the TCI state field in ascending (or descending) order of the list index among the M different list of cells for simultaneous TCI state update.

For example, when the UE is configured, in addition to List #1 above, also a List #2={cell #5, cell #6, cell #7, cell #8} for simultaneous TCI state, and the UE receives a third MC-DCI format that jointly schedules Set #3={cell #3, cell #4, cell #5, cell #6}, the third MC-DCI state can include two values for the TCI state, wherein the UE applies the first indicated TCI state value for {cell #3, cell #4} corresponding to List #1, and applies the second indicated TCI state value for {cell #5, cell #6} corresponding to List #2.

In various examples, a mapping among values of TCI state field and groups/lists of cells can be provided by higher layer configuration. For example, the UE can be provided information of an ordering of values for TCI state field and corresponding groups/lists of cells. For example, the UE can be provided via higher layer configuration that a first TCI state value in the MC-DCI format corresponds to a 3rd list of cells, and a second TCI state value in the MC-DCI format corresponds to a Pt list of cells, and so on.

In one example, when an MC-DCI format schedules a set of co-scheduled sets, and when the MC-DCI format indicates a TCI state for first cells, from the set of co-scheduled cells, that are included in a first list of cells for simultaneous TCI state, in one option, the indicated TCI state applies only the first cells (and not to second cells, from the first list of cells, that are not scheduled by the MC-DCI format). In another option, the TCI state indicated by the MC-DCI format applies to all cells from the first list of cells, regardless of whether or not the cells are scheduled by the MC-DCI format.

FIG. 7 illustrates a flow chart of a method 700 for TCI state indication by an MC-DCI format in relation to lists of cells for simultaneous TCI updates in accordance with various embodiments of the present disclosure. For example, the method 700 may be performed by the UE 116. FIG. 7 is for illustration and not intended as a limitation on the types of methods that can be utilized in embodiments of the present disclosure.

With reference to FIG. 7, a UE is configured first and second lists of cells for simultaneous TCI state update, 710. The UE is configured a set of co-scheduled cells that schedules PDSCHs or PUSCHs on the set of co-scheduled cells, and includes first cells from the first list of cells and second cells from the second list of cells, 720. The UE receives an MC-DCI format that includes first and second values for a TCI state field, 730. The UE applies a first TCI states, corresponding to the first value, to the first cells (or to the first list or cells) and applies a second TCI state, corresponding to the second value, to the second cells (or to the second list of cells), 740.

In yet another realization, when a set of co-scheduled cells, that is indicated by an MC-DCI format, includes (or overlaps with) M different list of cells for simultaneous TCI state update, the MC-DCI format can include only a single value for the TCI state field, wherein the single value corresponds to a single list of cells for simultaneous TCI state, and the MC-DCI format provides the index of the corresponding list. Therefore, the indication in the MC-DCI format can include a list index as well as a TCI state value that corresponds to cells from the list whose list index is provided. For other cells from the set of cells that are jointly scheduled by a first MC-DCI format, the UE applies a most recent TCI state that is provided by an SC-DCI format or a second MC-DCI format, that is received before the MC-DCI format, possibly considering processing time or application time as previously described.

In the example setting described above, the UE can receive a fourth MC-DCI format that schedules Set #3={cell #3, cell #4, cell #5, cell #6}, and the MC-DCI format indicates list index #2 (using 2 bits when up to 4 lists of cells are configured), along with a corresponding TCI state. Therefore, the UE applies the indicated TCI state for {cell #5, cell #6} corresponding to List #2. For {cell #3, cell #4} corresponding to List #1, the UE applies most recent TCI states provided by most recent SC-DCI formats or MC-DCI formats prior to the fourth MC-DCI format (possibly considering the TCI state application/processing time).

This method can be extended to include multiple values corresponding to multiple lists. For example, the TCI state field can include a first list index and a first TCI state value corresponding to cells from the first list of cells (associated with the first list index), and a second list index and a second TCI state value corresponding to cells from the second list of cells (associated with the second list index). Alternatively, the MC-DCI format can include a bitmap that indicates for which lists a TCI state value is provided, along with a number of values for TCI states corresponding to the lists indicated by the bitmap (for example, with value 1 in the bitmap). A size of the bitmap can be equal to a number of list of cells for simultaneous TCI state, such as 4 bits when 4 lists of cells are configured. For example, when second and third bits of the bitmap are 1 s, the MC-DCI format will include two values for the TCI state field, corresponding to the second and third lists of cells.

There are a number of options regarding a number of values for the TCI state field in an MC-DCI format.

In a first option, when a UE is configured L different lists of cells for simultaneous TCI state update, an MC-DCI format can include M values, with M≤L, wherein M equals a number of lists that overlap with a set of co-scheduled cells that is indicated by the MC-DCI format or associated with a search space set according to which the MC-DCI format is monitored. For example, the UE can be configured L=4 different lists for simultaneous TCI state update, and the MC-DCI format can include only M=2 values for the TCI state field.

In a second option, when a UE is configured L different lists of cells for simultaneous TCI state update, an MC-DCI format can include M values, with M≤L, wherein M equals a maximum number of lists that overlap with any set of co-scheduled cells associated with a same scheduling cell, or a maximum number of lists that overlap with any set of co-scheduled cells configured to the UE.

In a third option, when a UE is configured L different lists of cells for simultaneous TCI state update, an MC-DCI format includes M=L values for the TCI state field.

For cases when an MC-DCI format, that scheduled a set of co-scheduled cells, includes M values for TCI state indication that is larger than a number M1 of lists of cells for simultaneous TCI state update that overlap with the set of co-scheduled cells (that is, M>M1), such as for the second or third option above, a number of alternatives can be considered.

In one alternative, the MC-DCI format can include (M−M1) reserved values for the TCI state field, such as all Os, corresponding to non-scheduled lists. In another alternative, the MC-DCI format can include non-reserved values for the TCI state field corresponding to the (M−M1) non-scheduled lists. For example, an MC-DCI format can include M=L values for the TCI state field, wherein M1 values correspond to first lists of cells for simultaneous TCI state update that overlap with the set of co-scheduled cells, and (L−M1) values correspond to second lists of cells for simultaneous TCI state update that are not scheduled by the MC-DCI format. The latter alternative allows for TCI state indication using MC-DCI format even for cells that are not scheduled by the MC-DCI format.

In a fourth option, an MC-DCI format can include a single value for the TCI state field, wherein the single value points to a row index from a table configured/activated by higher layers, and the row of the table provides up to L values corresponding to TCI state IDs for cells from the L configured lists of cells for simultaneous TCI state update. The table can be provided by RRC configuration or MAC-CE activation command. Accordingly, the UE determines a first TCI state for first cells from a first list based on a first value of the indicated row of the table, and determines a second TCI state for second cells from a second list based on a second value of the indicated row of the table. Therefore, the table provides a joint mapping or a multi-cell mapping for TCI state indication, wherein each tuple/row corresponds to the L configured lists of cells. When an MC-DCI format schedules a set of co-scheduled cells that includes cells from a list of cells for simultaneous TCI state update for which the indicated row of the table does not provide a TCI state ID value, the UE applies a most recent TCI state that is provided by an SC-DCI format or another MC-DCI format, that is received before the MC-DCI format, possibly considering processing time or application time as previously described.

In one example, an MC-DCI format can an MC-DCI format can include a single value for the TCI state field, wherein the single value points to a row index from a table configured by higher layers, and the row of the table provides:

up to N_max values corresponding to TCI state IDs for cells from N_max cells configured with multi-cell scheduling (that is, cells that are included in at least one configured set of co-scheduled cells), associated with a scheduling cell, or across different scheduling cells;

up to N_g values corresponding to TCI state IDs for up to N_g sub-sets of cells that are configured with multi-cell scheduling, associated with a scheduling cell, or across different scheduling cells;

or up to N values corresponding to TCI state IDs for all N configured serving cells, associated with a scheduling cell, or across different scheduling cells.

For example, when the TCI state field in the MC-DCI format points to a row in such a joint multi-cell TCI state table as described above, and the row in the table provides a TCI state ID for a first cell, the UE applies the TCI state ID to any second cell that is in a same list of cells, such as a same list of cells for simultaneous TCI state update, as the first cell.

In another example, when a first cell and a second cell are in a same list of cells for simultaneous TCI state update, and a row of a joint multi-cell TCI state table as described above provides a first TCI state ID for the first cell and a second TCI state ID for the second cell, the UE expects that the first TCI state ID is same as the second TCI state ID.

In yet more examples, the joint multi-cell TCI state table described above includes 8 combinations (such as 8 pairs, or 8 triples, and so on) of TCI state IDs corresponding to different cells or subsets of cells or list of cells, as described above. Therefore, an MC-DCI format can include 3 bits to indicate one of the 8 combinations of TCI state IDs. In another example, the table described above can includes more combinations, such as N>8 combinations of TCI state IDs corresponding to different cells or subsets of cells or list of cells. In such case, an MC-DCI format can include ceil(log 2(N)) bits for the TCI state field. For example, the table can include N=16 combinations, and the TCI state field can include 4 bits.

For example, TCI states in a combination of TCI states that is provided by a row in a joint multi-cell table for TCI state indication for multi-cell scheduling on a set/subset/number/list of cells can include TCI states that are configured by higher layers or activated by MAC-CE for the respective cells.

For example, the UE can be configured, via higher layer such as RRC information, a first set of 64 TCI states for a first cell and a second set of 64 TCI states for a second cell. For example, the UE can be configured, via higher layer such as RRC configuration, a third set of 16 pairs of TCI states for multi-cell PDSCH reception or PUSCH transmissions on the first and the second cells, wherein each pair from the 16 pairs includes a first TCI state from the first set of 64 TCI states on the first cell, and a second TCI state from the second set of 64 TCI states on the second cell. For example, a codepoint provided in a multi-cell scheduling DCI format indicates one of the 16 pairs of TCI states that are based on first and second indexes of configured TCI states on the first and second cells.

In another example, the UE can be provided, via a first MAC-CE command, a first set of 8 activated TCI states from the 64 configured TCI states for the first cell, and via a second MAC-CE command, a second set of 8 activated TCI states from the 64 configured TCI states for the second cell. For example, the UE can be configured, via higher layer such as RRC configuration, a third set of 16 pairs of TCI state indexes for multi-cell PDSCH reception or PUSCH transmissions on the first and the second cells, wherein each pair from the 16 pairs includes a first TCI state index from the first set of 8 activated TCI states on the first cell, and a second TCI state from the second set of 8 activated TCI states on the second cell. For example, a codepoint provided in a multi-cell scheduling DCI format indicates one of the 16 pairs of activated TCI states that are based on first and second indexes of activated TCI states on the first and second cells. For example, a codepoint in the multi-cell scheduling DCI format can indicate a pair of values, with each pair including a first index n1 from a set {0, 1, . . . , 7} and a second index n2 from a set of {0, 1, . . . , 7}, wherein the first index and the second indexes corresponds to n1-th activated TCI states on the first cell and n2-th activated TCI state on the second cell. For example, a pair (2, 5) indicates an activated TCI state index n1=2 on the first cell (which can point to a configured TCI state index m1, such as m1=21), and an activated TCI state index n2=5 on the second cell (which can point to a configured TCI state index m2, such as m2=17), wherein the indexes m1 and m2 are provided by the first and second MAC-CE commands.

For example, while the configured indexes for the activated values for each cell can be updated by MAC-CE activation/deactivation/update commend individually for each cell, the linking provided by the combinations is maintained based on RRC configuration. For example, the UE can receive a later time third and fourth MAC-CE commands received later for the first and second cells that provide configured indexes m1=14 and m2=26, for the sub-selected pair (n1, n2), (2, 5).

In another example, a combination of TCI state ID provided by a row in the joint multi-cell TCI state table described above can include a TCI state ID that is activated by a MAC-CE command for each cell or each set/subset/list of cells from cells corresponding to the row. For example, the UE receives a first MAC-CE activating first 8 TCI states (for example, from first 64 configured TCI states) for a first cell, and a second MAC-CE activating second 8 TCI states (for example, from second 64 configured TCI states) for a second cell. Then, the UE receives a third MAC-CE that includes a joint multi-cell TCI state table that activates 8 pairs of TCI states for multi-cell scheduling from the 8×8=64 pairs of (individually) activated TCI states for the first cell and the second cell.

In further examples, a combination of TCI state ID provided by a row in the joint multi-cell TCI state table described above can include a TCI state ID that is an RRC configured TCI state ID for each cell from cells corresponding to the row. For example, the UE receives first RRC information configurating first 64 TCI states for a first cell, and second RRC information configuring second 64 TCI states for a second cell. Then, the UE receives a MAC-CE that includes a joint multi-cell TCI state table that activates 8 pairs of TCI states for multi-cell scheduling from the 64×64=4096 pairs of configured TCI states for the first cell and the second cell. For example, the UE may not need individual MAC-CE commands for each cell (or list of cells), at least when the UE does not monitor single-cell scheduling DCI formats for the first cell or the second cell.

In one example, a signaling method for the joint multi-cell TCI state table can be based on the number of TCI states configured (or activated) for each cell in a set of cells or based on the signaling method for the TCI states applicable to each cell from the set of cells for multi-cell scheduling. For example, if a number of configured (or activated) TCI states for one cell or for each cell/all cells from a set of cells is smaller than (or equal to) a threshold, such as 8 TCI states, then the joint multi-cell TCI table can be provided by RRC configuration. For example, when the number of configured (or activated) TCI states for one cell or for each cell/all cells in a set of cells is larger than (or equal to) the threshold, then the joint multi-cell TCI table can be provided by MAC-CE activation command. For example, when the UE has not received any individual per-cell MAC-CE command for activation of TCI states for one cell or for each cell/all cells in a set of cells (such as when a single-cell scheduling DCI format, e.g., a DCI format 1_0/1_1/1_2, for a cell includes a TCI field with values directly from the set of TCI states configured by RRC, rather than from a set of TCI states activated by MAC-CE, corresponding to the one/each cell), then the joint multi-cell TCI table can be provided by RRC configuration. For example, when the UE has received (at least) one individual per-cell MAC-CE command for activation of TCI states for (at least) one cell or for each cell/all cells in a set of cells (such as when a single-cell scheduling DCI format, e.g., a DCI format 1_0/1_1/1_2, for the one/each cell includes a TCI field with values from a set of TCI states activated by MAC-CE, that are a subset of the set of TCI states configured by RRC corresponding to the one/each cell), then the joint multi-cell TCI table can be provided by MAC-CE activation command. Similar method applies to fields other than TCI field, such as RM indicator field, ZP CSI-RS trigger field, TDRA, and so on.

In one example, the UE can determine that a TCI state indicated by an MC-DCI format is invalid. For example, when a TCI field of the MC-DCI indicates a TCI state combination that points to a first TCI state for a first cell and the first TCI state is not a valid TCI state for the first cell. For example, the TCI state combination includes a first TCI state index for the first cell that is not configured for the first cell by RRC or is not activated for the first cell via a (per-cell) MAC-CE command for TCI state activation for the first cell. For example, the TCI state combination indicates a TCI state index 6 for the first cell, while the MAC-CE command for TCI state activation for the first cell has activated only 4 TCI states with indexes 0 through 3, so a TCI state index 6 is not activated/available/applicable, and therefore invalid.

When a first TCI state, corresponding to a first cell, from a TCI state combination indicated by the TCI field of a multi-cell scheduling DCI (MC-DCI) format 1_3 is invalid, in one option, the UE discards the first TCI state for the first cell. For example, the UE does not apply the first TCI state as an "indicated" TCI state for the first cell (for example, when the UE operates with the Rel-17 unified TCI framework). For example, the UE applies or continues to apply a most recent indicated TCI state, such as a TCI state indicated by a previous single-cell scheduling DCI (SC-DCI) format or a previous MC-DCI format, taking into account any processing time such as PDSCH/PUSCH processing time or time for QCL application, or beam application time as descried earlier in the present disclosure (for example, when the UE operates with the Rel-17 unified TCI framework). For example, the UE applies a default spatial relation for the first cell or for a first PDSCH corresponding to the first cell that was scheduled by the MC-DCI format 1_3 (for example, when the UE operates with the Rel-15/16 TCI framework). In another option, the UE discard the first PDSCH corresponding to the first cell that was scheduled by the MC-DCI format 1_3 (for example, when the UE operates with the Rel-15/16 TCI framework). In another option, the UE discards all TCI states indicated by the TCI state combination of the MC-DCI format 1_3 for all cells scheduled by the MC-DCI or for all cells in the corresponding set of cells for multi-cell scheduling. In yet another option, the UE discards the MC-DCI format 1_3 entirely and discard all PDSCHs (that is, does not receive any PDSCHs) that were scheduled by the MC-DCI.

In one example, the UE can report a capability for a number of TCI states that the UE can support across a set/number of co-scheduled cells. For example, the UE reports that the UE can support (only) N=1 or 2 TCI states in a same symbol or slot across multiple serving cells/carrier frequencies/frequency bands. For example, the UE capability can be based on a number of independent RF chains or antenna panels or arrays or sub-arrays that the UE supports. For example, the UE can be provided, via RRC configuration or via a MAC-CE for cell-set-level sub-selection of activated TCI states, a joint multi-cell table for indication of combinations of TCI states for one or multiple sets/subsets/numbers/lists of co-scheduled cells or lists of serving cells such as lists of cells for simultaneous TCI state update. For example, a multi-cell scheduling DCI format can include a codepoint that indicates a combination of TCI states for one or multiple sets/subsets/numbers/lists of co-scheduled cells or lists of serving cells such as lists of cells for simultaneous TCI state update. For example, the UE does not expect that the combination of TCI states, provided by the RRC configuration or by the MAC-CE command or by the codepoint in the DCI format, is such that the UE would need to apply more than N different TCI states for PDSCH receptions or for PUSCH transmission. In another example, the UE can report a first such number for a maximum number of TCI states for DL such as for co-scheduled PDSCH receptions and a second such number for a maximum number of TCI states for UL such as for co-scheduled PUSCH transmissions.

For example, a UE can apply one or multiple default or reference TCI states for a number of co-scheduled cells such as a set or subset or list of co-scheduled cells. For example, the default or reference TCI state may apply before receiving dedicated TCI state indication, such as a DCI format that provides an indicated TCI states or a MAC-CE command that activates a number of TCI states to be indicated by the DCI format. For example, the UE may apply the default or reference TCI states when a scheduling offset for the corresponding PDSCH reception (or PUSCH transmission) is less than a number of symbols or slot for beam indication application (e.g., beamAppTime), such as for processing the DCI or acquisition of the TCI states, beam switching latency and so on.

In one example, the UE can determine separate default or reference TCI states for different co-scheduled cells. In another example, the UE can determine a same default or reference TCI state for different co-scheduled cells. In one example, determining of a same or different default or reference TCI states for co-scheduled cells can be based on a UE capability. For example, a UE reporting a capability for N TCI states in a same time can apply N separate default or reference TCI states. For example, a UE reporting a capability for only one TCI state at a same time/symbol/slot can apply a single/same default or reference TCI state for different co-scheduled cells.

In another embodiment, the UE can be configured with a reference cell, and the UE can be configured with a set of reference TCI states or can be provided a MAC CE activation command that activates a set of reference TCI states. Accordingly, the UE can receive an MC-DCI format that indicates a TCI state from the configured/activated set of reference TCI states. The UE applies the indicated TCI state to all cells in the set of co-scheduled cells. In one example, the reference cell can be a scheduling cell on which the UE receives the corresponding MC-DCI format. In another example, the reference cell can be a cell from the set of scheduled cells, such as a cell with smallest or largest cell index or CIF among the set of co-scheduled cells. In one example, the reference cell can be the PCell for the UE. In one example, the reference cell is provided by higher layer configuration.

In another example, the reference cell for TCI state indication is specific to a set of co-scheduled cells. For example, the UE can be configured/determine a first reference cell for a first set of co-scheduled cells, and a second reference cell for a second set of co-scheduled cells. In another example, the reference cell can be common to different sets of co-scheduled cells that have a same scheduling cell. For example, a first reference cells applies to first and second sets of co-scheduled cells that correspond to a first scheduling cell. For example, the UE can be configured/determine a second reference cell for third and fourth set of co-scheduled cells that correspond to a second scheduling cell. In another example, the reference cell can be common to all sets of co-scheduled cells corresponding to all scheduling cells. Similar examples apply to the configured/activated set of reference TCI states applicable to sets of co-scheduled cells.

In yet another example, when the UE is configured both lists of cells for simultaneous TCI state update and reference TCI states on a reference cell, an MC-DCI format (or an SC-DCI format) can include a 1-bit field to indicate whether a value provided by a TCI state field in the MC-DCI (or the SC-DCI) format corresponds to the lists of cells or corresponds to the reference TCI states.

Figure 8:
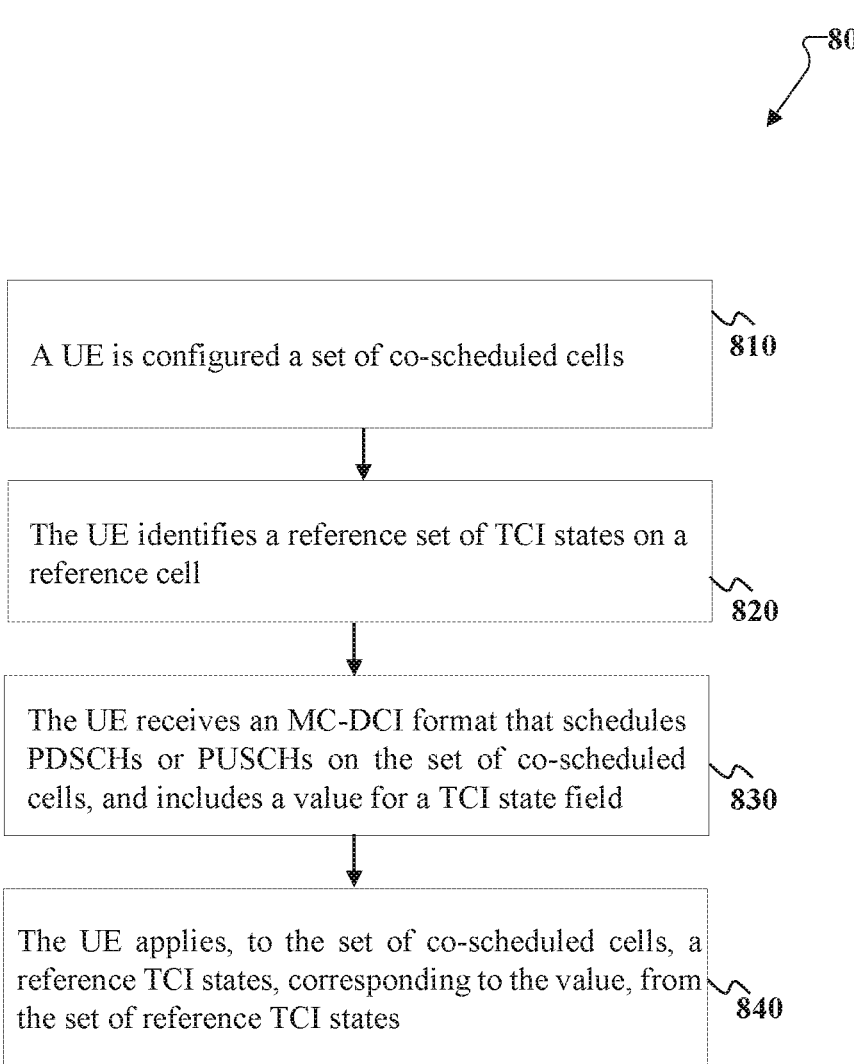
FIG. 8 illustrates a flow chart of a method for TCI state indication by an MC-DCI format in relation to a set of reference TCI states according to embodiments of the present disclosure.

FIG. 8 illustrates a flow chart of a method 800 for TCI state indication by an MC-DCI format in relation to a set of reference TCI states in accordance with various embodiments of the present disclosure. For example, the method 800 may be performed by the UE 116. FIG. 8 is for illustration and not intended as a limitation on the types of methods that can be utilized in embodiments of the present disclosure.

With reference to FIG. 8, a UE is configured a set of co-scheduled cells, 810. The UE identifies a reference set of TCI states on a reference cell, 820. The UE receives an MC-DCI format that includes a value for a TCI state field, 830. The UE applies, to the set of co-scheduled cells, a reference TCI states, corresponding to the value, from the set of reference TCI states, 840.

In one example, when an MC-DCI format includes one or multiple values for a TCI state field, the UE applies the indicated TCI states (based on any of the methods described above) to the co-scheduled PDSCHs or co-scheduled PUSCHs that are jointly scheduled by the MC-DCI format.

In another example, the indicated TCI states correspond to subsequent PDSCH receptions or PUSCH transmission on corresponding cells that are scheduled by subsequent SC-DCI formats or MC-DCI format, such as those that are BeamAppTime_r17 symbols after a last symbol of a PUCCH that include HARQ-ACK information corresponding to the PDSCHs that are scheduled by the MC-DCI format, or corresponding to the MC-DCI format when the MC-DCI format schedules PUSCHs. Accordingly, for reception of PDSCHs or transmission of PUSCHs that are scheduled by the MC-DCI format, the UE applies TCI states that are provided by most recent TCI states that are indicated for the corresponding cells using previous SC-DCI formats or MC-DCI formats.

In some examples, the UE determines whether a TCI state indicated by an MC-DCI format is a DL or UL or joint DL/UL TCI state (and not a DL TCI state) based on higher layer configuration or MAC CE activation command for the TCI state, for example for the list of cells for simultaneous TCI state update.

For example, the UE can be provided higher layer configuration, such as RRC information element unifiedTCI-StateType, that indicates whether TCI states configured for a serving cell are from a joint TCI state type that are applicable to both downlink and uplink operation, or whether the configured TCI states for the serving cell are of a separate type that need separate TCI state indication for DL and for UL operation. In one example, the UE expects that, all co-scheduled cells have a same unifiedTCI-State-Type, therefore all cells operate with joint DL/UL TCI states, or all cells operate with separate DL/UL TCI states. In another example, each co-scheduled cell or each list of cells from the set of co-scheduled cells can have separate/different unifiedTCI-StateType. In one example, cells in a list of cells, such as a list of cells for simultaneous TCI state update, are provided a same configuration for unifiedTCI-StateType, but different lists can have separate/different configurations for unifiedTCI-StateType.

For example, when a MAC CE command activates a TCI state for a cell or a list of cells and provides a 'direction' of the activated TCI state as a DL TCI state (respectively, UL TCI state or joint DL/UL TCI state), and the MC-DCI indicates the TCI state, the UE applies the TCI states as a DL TCI state (respectively, as an UL TCI state or as a joint DL/UL TCI state) for the cell or for the list of cells.

In yet another example, only a DL MC-DCI format such as DCI format 1_3 includes a TCI state field, and an UL MC-DCI format such as DCI format 0_3 does not include a TCI state field. In one example, both DL MC-DCI format 1_3 and UL DCI format 0_3 can include a TCI state field.

For example, a UE does not expect to receive first lists of cells for simultaneous DL TCI state (respectively, UL TCI state) and second lists of cells for simultaneous joint DL/UL TCI state that share common cells. Accordingly, when an MC-DCI format indicates a TCI state for cells whose associated list of cells for simultaneous TCI state is configured for DL TCI state (respectively, UL TCI state), the indicated TCI state is a DL TCI state (respectively, UL TCI state). For example, when an MC-DCI format indicates a TCI state for cells whose associated list of cells for simultaneous TCI state is configured for joint DL/UL TCI state, the indicated TCI state is a joint DL/UL TCI state.

In some examples, for a MC-DCI format such as DCI format 1_3 (or 0_3) that schedules a set of co-scheduled cells, the MC-DCI format can indicate first and second TCI states for first and second cells, from the set of co-scheduled cells, wherein the first TCI state is a DL TCI state (or UL TCI state), and the second TCI state is a joint DL/UL TCI state.

In one example, when the UE is not configured list of cells for simultaneous TCI state update, the UE can be configured whether the MC-DCI format includes cell-specific values for the TCI state field (that is, separate TCI states provided by each cell or each sub-group of cells from the set of co-scheduled cells) or a cell-common value providing a single TCI state applicable to all cells in the set of co-scheduled cells.

The above methods and examples were described using the notion of lists of cells for simultaneous TCI state update. Same methods and examples apply with lists of cells for simultaneous TCI state replaced by other configured lists of cells, such as sub-groups of cells, that can be different from the lists of cells for simultaneous TCI state update. In one example, same sub-groups of cells can be configured for multiple fields in the MC-DCI format, such as for TDRA field, TCI state field, rate matching pattern indicator field, ZP CSI-RS trigger field, and so on.

For example, for any field in a multi-cell scheduling DCI format that is (pre)determined to operate based on a joint multi-cell table, the UE can be provided with a "cell-set-level" MAC-CE command that provides the joint multi-cell table. For example, the "cell-set-level" MAC-CE command provides a list of "activated" combinations that are a sub-selection among possible combinations of values, across different co-scheduled cells, for the respective field. For example, the multi-cell scheduling DCI format provides a codepoint for the respective field that indicates a row of the joint multi-cell table, that is, an "activated" combination from the list of activated combinations. For example, values provided by each activated combination can be from a set of configured values provided by higher layers or from a subset of activated value by other MAC-CE commands individually for each cell, from the set/subset/number/list of cells. For example, each combination can include explicit values for the respective field, or can include indexes to the corresponding values, wherein the indexes are provided by higher layer configuration or by a MAC-CE command.

In another example, the cell-set-level sub-selection is provided an RRC configuration, wherein the sub-selected combinations of values are from a respective set of RRC-configured values (or corresponding indexes) for each respective cell, or from a respective set of MAC-CE activated/selected values (or corresponding indexes) for each respective cell. For example, while the configured indexes for the activated values for each cell can be updated by MAC-CE activation/deactivation/update commend individually for each cell, the linking provided by the combinations is maintained based on RRC configuration. For example, the UE can be provided by RRC configuration a combination of indexes (n1, n2), (2, 5), wherein the indexes n1=2 and n2=5 may point to respective values with configured indexes m1=21 and m2=17, based on first and second MAC-CE commands received for the first and second cells, while the indexes n1=2 and n2=5 may at a later time point to respective values with configured indexes m1=14 and m2=26, based on third and fourth MAC-CE commands received later for the first and second cells.

For example, the field can include one or more of: Rate matching indicator, ZP CSI-RS trigger, TCI, SRS request, SRS offset indicator, or TDRA. For example, a DCI format for multi-cell scheduling can include 4 bits for a rate matching indicator, so that a codepoint can indicate one out of 16 combinations of rate matching patter indicator values for the co-scheduled cells. For example, each combination includes up to 4 values corresponding to up to 4 cells. For example, a list of 16 combinations is provided by higher layer configuration or by a MAC-CE command. For example, a value from the up to 4 values in each combination include a codepoint or index for a rate matching pattern indicator for a respective cell. For example, a combination for an SRS offset indicator can include a list of up to 4 values for the SRS offset, or can include a list of up to 4 indexes, wherein each index is from a set of indexes for SRS offset values that are configured by RRC or activated by MAC-CE for a respective cell. Similar methods hold for other parameters, such as ZP CSI-RS trigger, SRS request, or TDRA.

In one example, uplink MIMO fields are cell-common fields for a set of co-scheduled PUSCHs. For example, a same SRI and a same PMI can be shared by all co-scheduled PUSCHs. For example, when the UE is configured with two SRS resource sets for codebook-based or non-codebook-based PUSCH transmission on first cell(s) from a set of co-scheduled cells, the multi-cell scheduling DCI format can include cell-common "SRS resource set indicator", "second SRI", and "second PMI" fields that commonly apply to the co-scheduled PUSCH(s) on the first cell(s). For example, the UE ignores those DCI fields for remaining cell(s) from the set of co-scheduled cells that are not configured two SRS resource sets for codebook-based or non-codebook-based PUSCH transmission.

In other examples, SRI and PMI fields, and when configured/applicable, second SRI, second PMI and SRS resource set indicator fields are cell-specific fields that are separately provided for each of co-scheduled cells.

In yet another example, a DCI format for multi-cell scheduling includes a first SRI and PMI field for first cell(s), and a second SRI and PMI field for second cell(s), wherein:

the first and second cell(s) are subset of the set of co-scheduled cells, and the first cell(s) are configured/activated/indicated to follow a first UL TCI or a first pathloss RS, the second cell(s) are configured/activated/indicated to follow a second UL TCI or a second pathloss RS.

In some other examples, a TPC command field for co-scheduled PUSCHs can be a cell-specific field in a DCI format for multi-cell scheduling that is provided separately for each of co-scheduled PUSCHs. In another example, the TPC command field for co-scheduled PUSCHs can be shared for each subset of co-scheduled cell(s) that follow a same pathloss reference signal or follow a same SRS or UL TCI state for PUSCH transmission. Therefore, the DCI format can include a number of TPC command fields equal to a (maximum) number of pathloss RSs or SRS resources or UL TCIs corresponding to the set of co-scheduled cells.

In one example, a serving cell from a set of co-scheduled cells can operate with two or multiple transmission-reception points (TRPs). Herein, operation with one or TRP can be based on, for example, configuration of one or two CORESETpoolIndex values or configuration of one or two SRS resource sets with usage as 'codebook' or 'noncodebook', respectively. In such case, in one alternative, both TRPs of the serving cell have a same unifiedTCI-StateType, and therefore same TCI state(s) apply to both TRPs. For example, when the serving cell is configured unifiedTCI-StateType as joint, then a same TCI state applies to both DL and UL of both TRPs of a serving cell. For example, when the serving cell is configured untfiedTCI-StateType as separate, a first TCI state applies as DL TCI state of both TRPs, and a second TCI state applies as UL TCI state of both TRPs of the serving cell. In a second alternative, each TRP of the serving cell can have a separate configuration for untfiedTCI-StateType, so a first TRP of the serving cell is configured untfiedTCI-StateType as joint, and a second TRP of the serving cell is configured untfiedTCI-StateType as separate.

In one example, a UE expects not to be configured with two TRPs for any serving cells from a set of co-scheduled cells. In another example, a UE can be configured with two TRPs for some co-scheduled cells. For example, a UE does not expect to be configured a set of co-scheduled cell including a first cell and a second cell, wherein the first cell is configured one TRP and the second cell is configured two TRPs. In one example, the UE does not expect to be configured a set of co-scheduled cell including a first cell and a second cell, wherein the first cell is configured with two TRPs having a same untfiedTCI-StateType configuration, and the second cell is configured with two TRPs having a different untfiedTCI-StateType configurations. In one example, a UE expects that all cells and corresponding TRPs within a same list of cells, such as a list of cells for simultaneous TCI state update, have a same configuration for unifiedTCI-StateType.

In one example, an MC-DCI format can indicate a first TCI state value for first TRPs corresponding to a first list of cells, such as a first list of cells for simultaneous TCI state update, and a second TCI state value for second TPRs corresponding to the first list of cells. For example, when a first cell from the first list of cells does not include a configuration for a second TRP, the UE discards that value for the first cell (and the value can be applied to a second TRP of a second cell from the first list of cells).

Various embodiments of the present disclosure provide for determination of the presence or absence of TCI field in MC-DCI format. In one embodiment, the UE determines whether an MC-DCI format includes or does not include a TCI state field based on the specifications for system operation or based on higher layer configuration. Additionally, the MC-DCI format can include an indication, such as a 1-bit flag, that indicates whether the UE needs to apply, for the TCI state of the co-scheduled cells, a value provided by a most recent SC-DCI format (or a most recent MC-DCI format) or a reference value configured or activated by higher layers, such as RRC or MAC CE, on a reference cell.

In one example, the specifications for system operation determines whether an MC-DCI format does or does not include a value for a TCI state field.

In another example, higher layers such as RRC provides information of whether the MC-DCI format includes one or multiple values for the TCI state field, for example based on the methods described in embodiments above, or whether the MC-DCI format does not include a value for the TCI state field, with behaviors as described in embodiments above.

In one example, an MC-DCI format can include an indication, such as a 1-bit field, that indicates whether the UE applies, for PDSCHs or PUSCHs co-scheduled by the MC-DCI format, TCI states provided by most recent SC-DCI formats (or most recent MC-DCI formats) or whether the UE applies a reference TCI state. Herein, a reference TCI state can be configured by higher layers such as RRC or activated by a MAC-CE command. The reference TCI state can be separately provided for each of the co-scheduled cells, or a same reference TCI state can be provided for all co-scheduled cells. For example, the UE can be provided a first reference TCI state for a first sub-groups of cells, and a second reference TCI state for a second sub-group of cells, where the first and second sub-groups of cells are from the set of co-scheduled cells. The indication can be configurable by higher layers. For example, a reference TCI state can be based on a set of reference TCI states as described in embodiments above. For example, a reference TCI state can be a first (or a last) TCI state, or a reference TCI state with smallest (or largest) TCI state ID, from the set of reference TCI states activated by the MAC CE or configured by RRC.

In one example, the MC-DCI format includes such indication only when the TCI state field is absent in the MC-DCI format. In another example, the MC-DCI format includes such indication also when the TCI state field is present in the MC-DCI format, for example, because the UE does not apply the TCI state indicated by the MC-DCI format to co-scheduled PDSCHs or PUSCHs (due to beam application time delay), and therefore needs to rely on other TCI state indication (such as a previously indicated TCI state or a default TCI state) for the co-scheduled PDSCHs or PUSCHs.

Such indication can be beneficial, for example, when the UE fails to receive and decode a first SC-DCI format (or a first MC-DCI format) with a TCI state indication, and therefore the UE would apply a 'older' TCI state indicated by a second SC-DCI format (or a second MC-DCI format) with a TCI state indication that the UE was able to successfully receive and decode, wherein the second SC-DCI format (or the second MC-DCI format) was transmitted by the gNB earlier than the first SC-DCI format (or the first MC-DCI format). Accordingly, the gNB can provide, in an MC-DCI format transmitted after the first SC-DCI format (or the first MC-DCI format), the 1-bit indication whether the gNB prefers the UE to use the 'old' TCI state indicated by the second SC-DCI/MC-DCI format, or to use the reference/default TCI state. In one example, when such field is not provided in the MC-DCI format, the UE applies the 'old' TCI state indicated by the second SC-DCI/MC-DCI format.

The methods and examples described above for TCI state indication can be applied to other scheduling parameters for multi-cell scheduling, such as rate matching pattern, ZP CSI-RS trigger, and so on. For example, the corresponding fields can be absent in the MC-DCI format, and the UE determines the corresponding parameter value from most recent SC-DCI format (or MC-DCI format) that indicate a value for the parameter, possibly considering UE/gNB processing or application time. For example, the corresponding fields can be present in the MC-DCI format and provided for lists of cells or sub-groups of cells. For example, the corresponding fields can be present in the MC-DCI format and provided with respect to reference values on a reference cell. For example, the MC-DCI format can include one or multiple indications (such as 1-bit indications), corresponding to the set of co-scheduled cells or corresponding to multiple sub-groups of cells from the set of co-scheduled cells, wherein the indications indicate whether the UE needs to apply, for a scheduling parameter, a value from a most recent SC-DCI format (or MC-DCI format) or apply a reference value provide by higher layer configuration or MAC-CE activation command. For example, such indications can be separately provided for each corresponding scheduling parameter, or a same indication can be provided for different corresponding scheduling parameters such as a group of scheduling parameters. For example, a same indication can be provided for TCI state, rate matching pattern, ZP CSI-RS trigger, and so on.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
receiving:
    first information for a set of cells,
    second information for sets of transmission configuration indication (TCI) states associated with cells in the set of cells, respectively, and
    a first physical downlink control channel (PDCCH) that provides a first DCI format, wherein:
        the first DCI format schedules receptions of a first number of physical downlink shared channels (PDSCHs) on a first number of cells from the set of cells,
        the first DCI format includes a first TCI field indicating a combination of TCI states,
        the combination of TCI states includes a number of TCI states that is equal to a number of cells in the set of cells, and
        TCI states in the combination of TCI states have a one-to-one mapping to the cells in the set of cells;
determining first TCI states, from the combination of TCI states, having a one-to-one mapping with the first number of cells; and
receiving the first number of PDSCHs, or a second number of PDSCHs after the first number of PDSCHs, on the first number of cells based on the first TCI states, respectively.

2. The method of claim 1, further comprising:
receiving a second PDCCH that provides a second DCI format, wherein:
    the second PDCCH reception ends after an end of the first PDCCH reception,
    the second DCI format schedules a reception of a second PDSCH on a second cell from the set of cells, and
    the second cell is not among the first number of cells;
determining a second TCI state, from the combination of TCI states, that is associated with the second cell; and
receiving the second PDSCH on the second cell based on the second TCI state.

3. The method of claim 1, further comprising:
receiving third information for a list of cells for a simultaneous TCI state update, wherein the list of cells includes a first cell and a second cell from the first number of cells; and
determining:
    a first TCI state, from the first TCI states, associated with the first cell,
    a second TCI state, from the first TCI states, associated with the second cell, and
    that the first TCI state is the same as the second TCI state.

4. The method of claim 1, further comprising:
receiving third information for a list of cells for a simultaneous TCI state update, wherein the list of cells includes a first cell from the first number of cells; and determining:
   a first TCI state, from the first TCI states, associated
      with the first cell, and
   that the first TCI state is additionally associated with all
      other cells from the list of cells.
5. The method of claim 1, wherein:
the combination of TCI states is from a list of combinations of TCI states,
the list of combinations of TCI states is provided by first
   radio resource control (RRC) information, and the sets
   of TCI states are provided by second RRC information
   or activated by first medium access control control-
   elements (MAC-CEs).
6. The method of claim 1, further comprising:
receiving a second PDCCH that provides a second DCI
   format, wherein:
   an end of the first PDCCH reception is after an end of
      the second PDCCH reception, and
   the second DCI format includes a second TCI field that
      indicates a second TCI state for a first cell from the
      set of cells; and
receiving a first PDSCH, or a second PDSCH after the
   first PDSCH, on the first cell based on the second TCI
   state, wherein:
   the first DCI format further schedules reception of the
      first PDSCH on the first cell,
   the combination of TCI states includes a first TCI state
      having a one-to-one mapping with the first cell,
   the first TCI state is not included in a set of TCI states
      that is associated with the first cell, and
   the second TCI state is included in the set of TCI states
      that is associated with the first cell.
7. The method of claim 1, wherein:
the set of TCI states includes up to eight TCI states, and
the first TCI field indicates a value from up to 16 values.
8. A user equipment (UE) comprising:
a transceiver configured to receive:
   first information for a set of cells,
   second information for sets of transmission configuration indication (TCI) states associated with cells in
      the set of cells, respectively, and
   a first physical downlink control channel (PDCCH) that
      provides a first DCI format, wherein:
      the first DCI format schedules receptions of a first
         number of physical downlink shared channels
         (PDSCHs) on a first number of cells from the set
         of cells,
      the first DCI format includes a first TCI field indicating a combination of TCI states,
      the combination of TCI states includes a number of
         TCI states that is equal to a number of cells in the
         set of cells, and
      the TCI states in the combination of TCI states have
         a one-to-one mapping to the cells in the set of
         cells; and
a processor operably coupled to the transceiver, the processor configured to determine first TCI states, from the
   combination of TCI states, having a one-to-one mapping with the first number of cells,
wherein the transceiver is further configured to receive the
   first number of PDSCHs, or a second number of
   PDSCHs after the first number of PDSCHs, on the first
   number of cells based on the first TCI states, respectively.
9. The UE of claim 8, wherein:
the transceiver is further configured to receive a second
   PDCCH that provides a second DCI format, the second PDCCH reception ends after an end of the first
   PDCCH reception,
the second DCI format schedules a reception of a second
   PDSCH on a second cell from the set of cells,
the second cell is not among the first number of cells,
the processor is further configured to determine a second
   TCI state, from the combination of TCI states, that is
   associated with the second cell, and
the transceiver is further configured to receive the second
   PDSCH on the second cell based on the second TCI
   state.
10. The UE of claim 8, wherein:
the transceiver is further configured to receive third
   information for a list of cells for a simultaneous TCI
   state update;
the list of cells includes a first cell and a second cell from
   the first number of cells; and
the processor is further configured to determine:
   a first TCI state, from the first TCI states, associated
      with the first cell,
   a second TCI state, from the first TCI states, associated
      with the second cell, and
   that the first TCI state is the same as the second TCI
      state.
11. The UE of claim 8, wherein:
the transceiver is further configured to receive third
   information for a list of cells for a simultaneous TCI
   state update;
the list of cells includes a first cell from the first number
   of cells; and
the processor is further configured to determine:
   a first TCI state, from the first TCI states, associated
      with the first cell, and
   that the first TCI state is additionally associated with all
      other cells from the list of cells.
12. The UE of claim 8, wherein:
the combination of TCI states is from a list of combinations of TCI states,
the list of combinations of TCI states is provided by first
   radio resource control (RRC) information, and the sets
   of TCI states are provided by second RRC information
   or activated by first medium access control control-
   elements (MAC-CEs).
13. The UE of claim 8, wherein:
the transceiver is further configured to receive a second
   PDCCH that provides a second DCI format;
an end of the first PDCCH reception is after an end of the
   second PDCCH reception;
the second DCI format includes a second TCI field that
   indicates a second TCI state for a first cell from the set
   of cells;
the transceiver is further configured to receive a first
   PDSCH, or a second PDSCH after the first PDSCH, on
   the first cell based on the second TCI state;
the first DCI format further schedules reception of the first
   PDSCH on the first cell;
the combination of TCI states includes a first TCI state
   having a one-to-one mapping with the first cell;
the first TCI state is not included in a set of TCI states that
   is associated with the first cell; and
the second TCI state is included in the set of TCI states
   that is associated with the first cell.
14. The UE of claim 8, wherein:
the set of TCI states includes up to eight TCI states, and
the first TCI field indicates a value from up to 16 values.

15. A base station comprising:
a transceiver configured to transmit:
   first information for a set of cells,
   second information for sets of transmission configuration indication (TCI) states associated with the cells in the set of cells, respectively, and
   a first physical downlink control channel (PDCCH) that provides a first DCI format, wherein:
      the first DCI format schedules transmissions of a first number of physical downlink shared channels (PDSCHs) on a first number of cells from the set of cells,
      the first DCI format includes a first TCI field indicating a combination of TCI states,
      the combination of TCI states includes a number of TCI states that is equal to a number of cells in the set of cells, and
      the TCI states in the combination of TCI states have a one-to-one mapping to the cells in the set of cells; and
a processor operably coupled to the transceiver, the processor configured to determine first TCI states, from the combination of TCI states, having a one-to-one mapping with the first number of cells,
wherein the transceiver is further configured to transmit the first number of PDSCHs, or a second number of PDSCHs after the first number of PDSCHs, on the first number of cells based on the first TCI states, respectively.

16. The base station of claim 15, wherein:
the transceiver is further configured to transmit a second PDCCH that provides a second DCI format,
the second PDCCH transmission ends after an end of the first PDCCH transmission,
the second DCI format schedules a transmission of a second PDSCH on a second cell from the set of cells, wherein the second cell is not among the first number of cells,
the processor is further configured to determine a second TCI state, from the combination of TCI states, that is associated with the second cell, and
the transceiver is further configured to transmit the second PDSCH on the second cell based on the second TCI state.

17. The base station of claim 15, wherein:
the transceiver is further configured to transmit third information for a list of cells for a simultaneous TCI state update;

the list of cells includes a first cell and a second cell from the first number of cells; and
the processor is further configured to determine:
   a first TCI state, from the first TCI states, associated with the first cell,
   a second TCI state, from the first TCI states, associated with the second cell, and
   that the first TCI state is the same as the second TCI state.

18. The base station of claim 15, wherein:
the transceiver is further configured to transmit third information for a list of cells for a simultaneous TCI state update, wherein the list of cells includes a first cell from the first number of cells; and
the processor is further configured to determine:
   a first TCI state, from the first TCI states, associated with the first cell, and
   that the first TCI state is additionally associated with all other cells from the list of cells.

19. The base station of claim 15, wherein:
the combination of TCI states is from a list of combinations of TCI states,
the list of combinations of TCI states is provided by radio resource control (RRC) information, and the sets of TCI states are provided by second RRC information or activated by first medium access control control-elements (MAC-CEs).

20. The base station of claim 15, wherein:
the transceiver is further configured to transmit a second PDCCH that provides a second DCI format;
an end of the first PDCCH transmission is after an end of the second PDCCH transmission;
the second DCI format includes a second TCI field that indicates a second TCI state for a first cell from the set of cells;
the transceiver is further configured to transmit a first PDSCH, or a second PDSCH after the first PDSCH, on the first cell based on the second TCI state;
the first DCI format further schedules reception of the first PDSCH on the first cell;
the combination of TCI states includes a first TCI state having a one-to-one mapping with the first cell;
the first TCI state is not included in a set of TCI states that is associated with the first cell; and
the second TCI state is included in the set of TCI states that is associated with the first cell.

* * * * *